(12) United States Patent
Fujisawa et al.

(10) Patent No.: US 11,112,892 B2
(45) Date of Patent: Sep. 7, 2021

(54) STYLUS PEN

(71) Applicant: MITSUBISHI PENCIL COMPANY, LIMITED, Tokyo (JP)

(72) Inventors: Kiyoshi Fujisawa, Fujioka (JP); Masashi Sakagami, Tokyo (JP); Atsunori Satake, Fujioka (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/771,978

(22) PCT Filed: Dec. 12, 2018

(86) PCT No.: PCT/JP2018/045637
§ 371 (c)(1),
(2) Date: Jun. 11, 2020

(87) PCT Pub. No.: WO2019/117191
PCT Pub. Date: Jun. 20, 2019

(65) Prior Publication Data
US 2021/0072848 A1 Mar. 11, 2021

(30) Foreign Application Priority Data

Dec. 15, 2017 (JP) .............................. JP2017-240697
Apr. 25, 2018 (JP) .............................. JP2018-083601
Dec. 7, 2018 (JP) .............................. JP2018-230082

(51) Int. Cl.
*G06F 3/0354* (2013.01)
*G06F 3/044* (2006.01)

(52) U.S. Cl.
CPC ........ *G06F 3/03546* (2013.01); *G06F 3/0445* (2019.05)

(58) Field of Classification Search
CPC .......................... G06F 3/0445; G06F 3/03546
(Continued)

(56) References Cited

U.S. PATENT DOCUMENTS 9,092,077 B2 * 7/2015 Boyd ..................... B43K 7/005
9,442,578 B2 * 9/2016 Oh ....................... G06F 3/03545
(Continued)

FOREIGN PATENT DOCUMENTS

JP 10-161795 A 6/1998
JP 10-171580 A 6/1998
(Continued)

OTHER PUBLICATIONS

International Search Report dated Feb. 19, 2019, issued in counterpart application No. PCT/JP2018/045637, w/ English translation (3 pages).

*Primary Examiner* — Calvin C Ma
(74) *Attorney, Agent, or Firm* — Westerman, Hattori, Daniels & Adrian, LLP

(57) ABSTRACT

A stylus pen is disclosed with which coordinate information can be inputted accurately and whose operability can be improved. A stylus pen for inputting information by bringing a screen contacting portion into contact with a capacitive touch screen includes a barrel, a holder made of nonconductive material attached to a front end of the barrel, a screen contacting portion formed of conductive material and attached to a front end of the holder, and a connecting member made of conductive material that is disposed in the holder and has a resilient action along the axial direction and that conducts electricity when a front end portion of the connecting member comes into contact with the screen contacting portion. An outer diameter, perpendicular to the axial direction, of the connecting member is set to be smaller than an outer diameter, perpendicular to the axial direction, of the screen contacting portion.

8 Claims, 24 Drawing Sheets

(58) Field of Classification Search
USPC .................................................. 345/173, 179
See application file for complete search history.

(56) References Cited

U.S. PATENT DOCUMENTS

| | | | | |
|---|---|---|---|---|
| 9,519,363 B2* | 12/2016 | Mann | .................... | G06F 3/0383 |
| 2014/0218344 A1 | 8/2014 | Kuwata | | |
| 2018/0052531 A1* | 2/2018 | Peretz | ..................... | G06F 3/016 |
| 2019/0220108 A1* | 7/2019 | Li | ....................... | G06F 3/03545 |

FOREIGN PATENT DOCUMENTS

| | | |
|---|---|---|
| JP | 2014-149760 A | 8/2014 |
| JP | 2015-69294 A | 4/2015 |
| JP | 2016-91089 A | 5/2016 |

\* cited by examiner

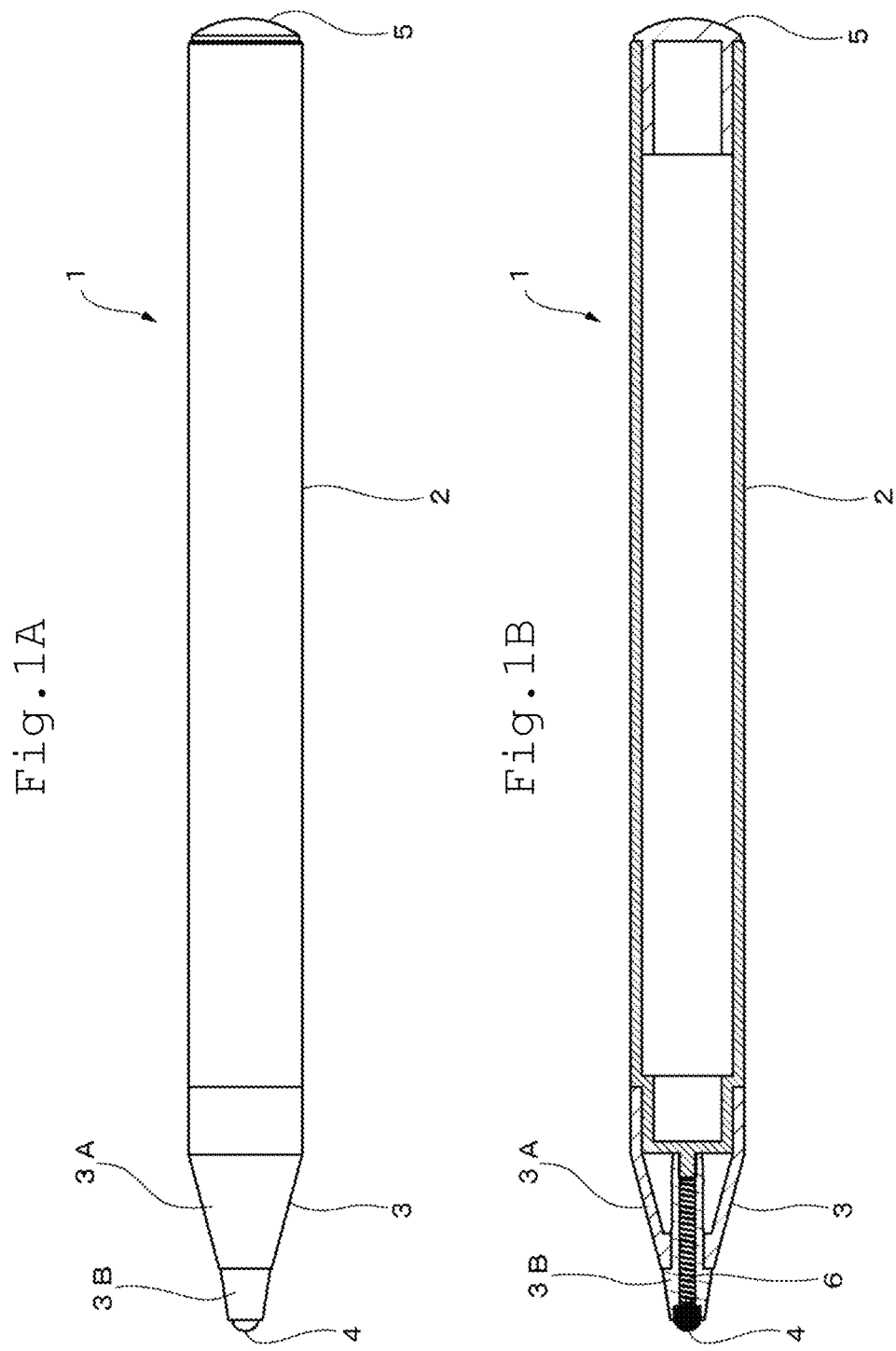

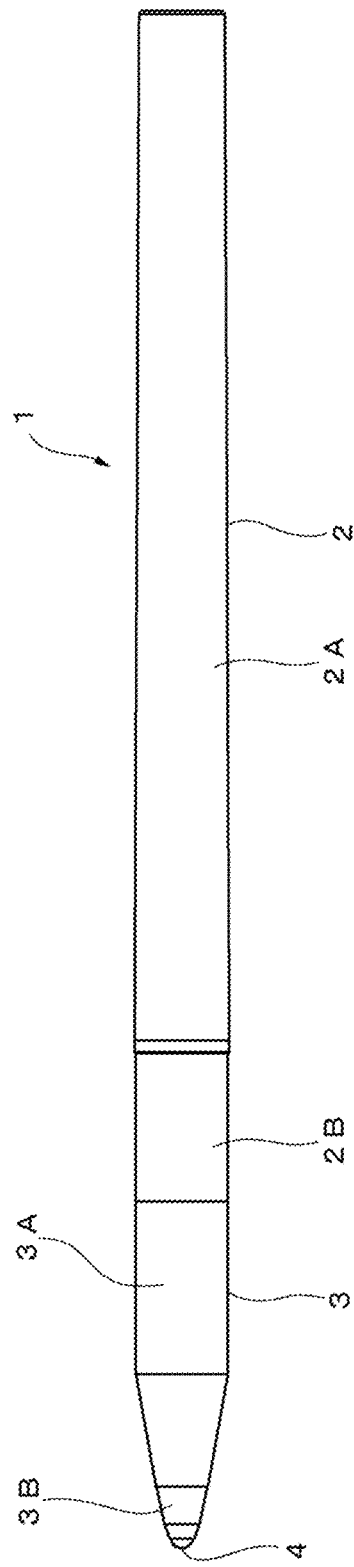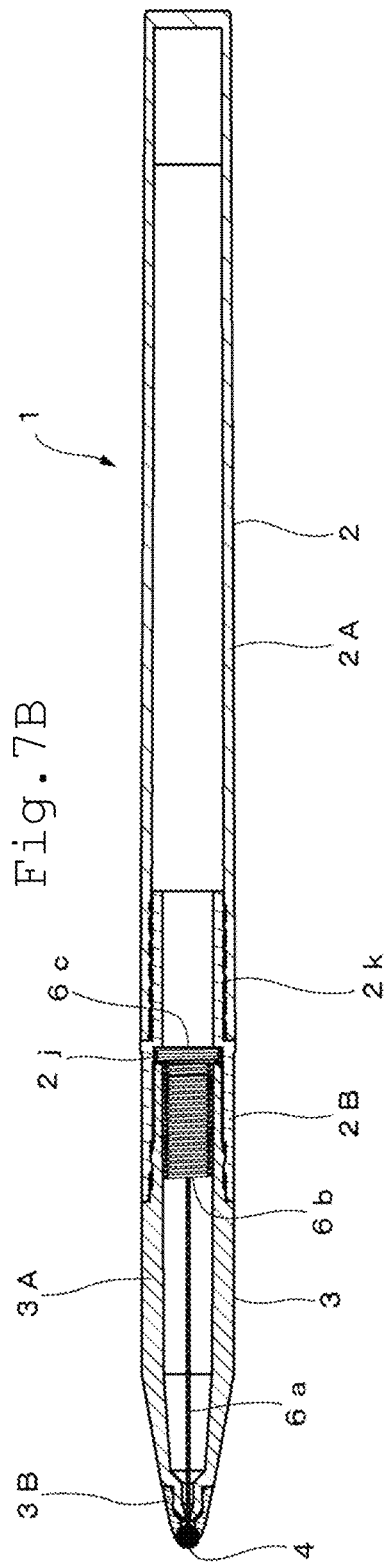

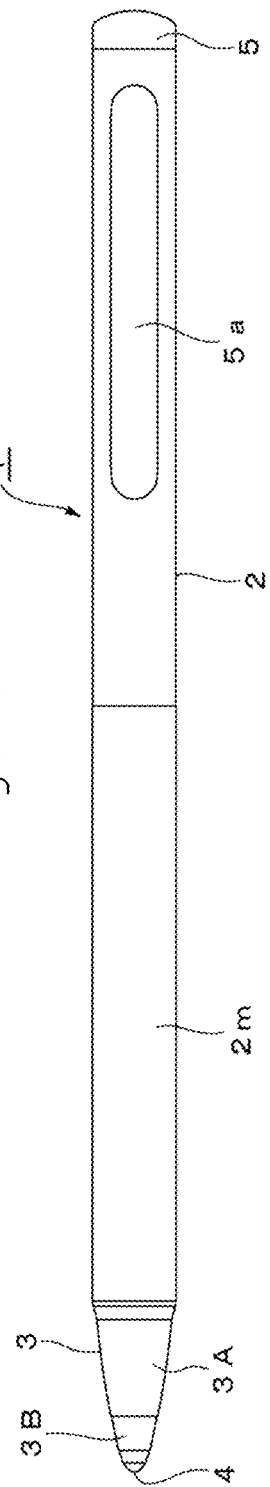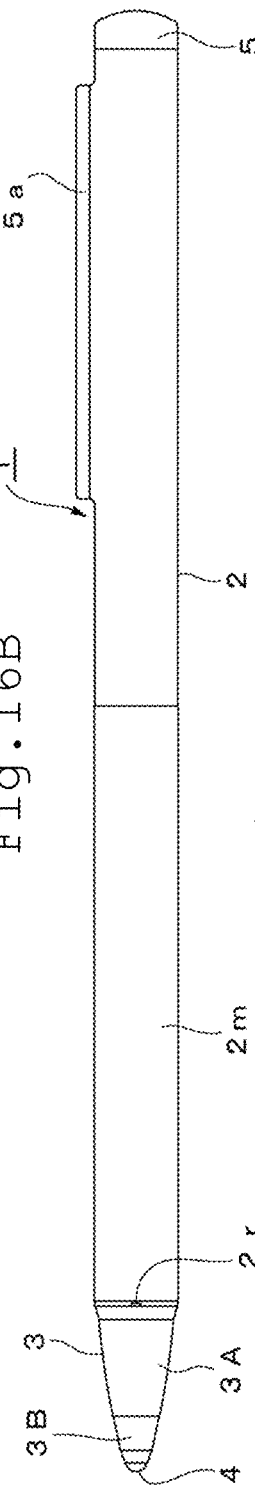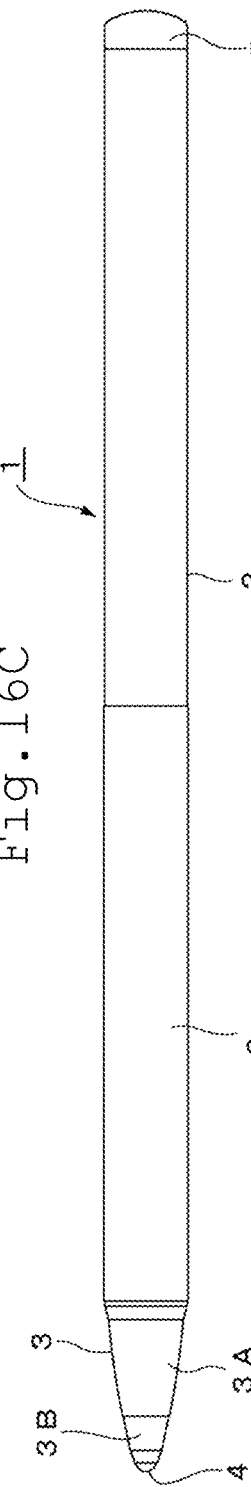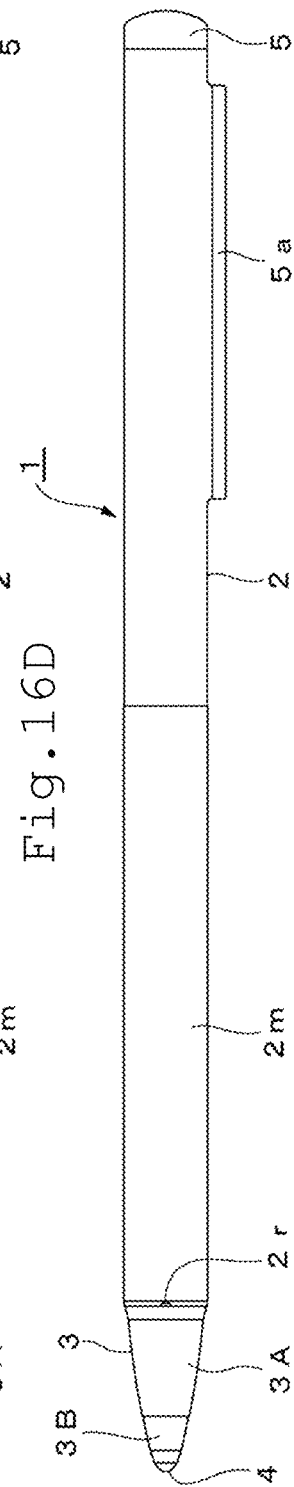

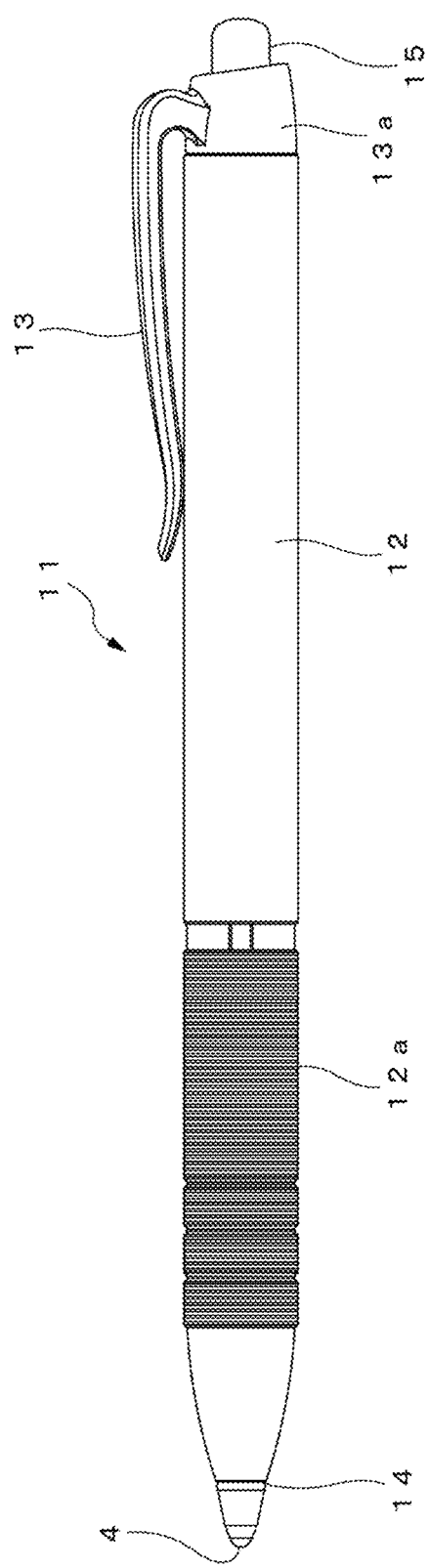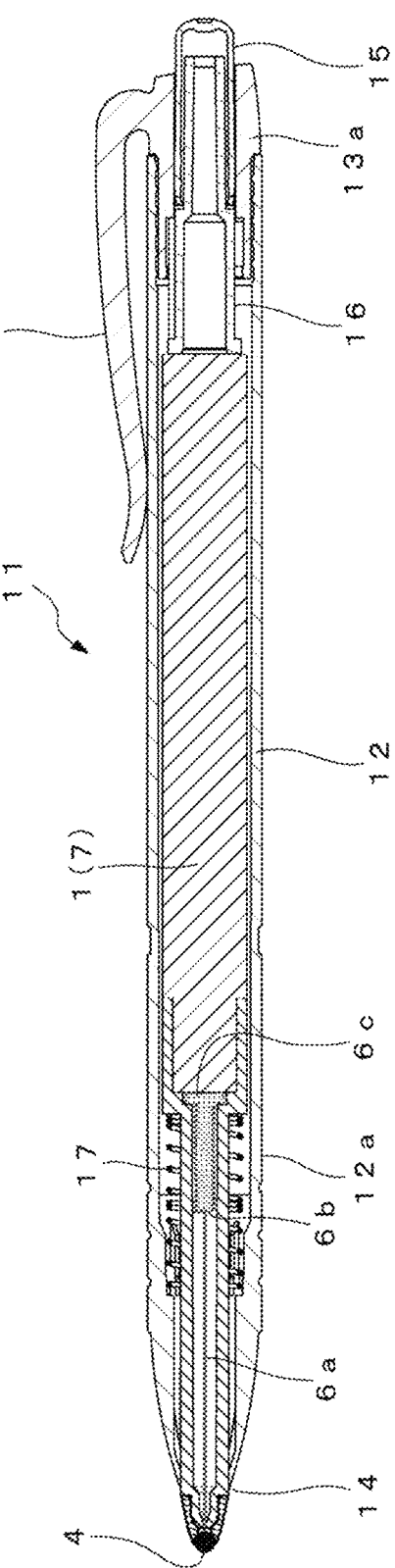

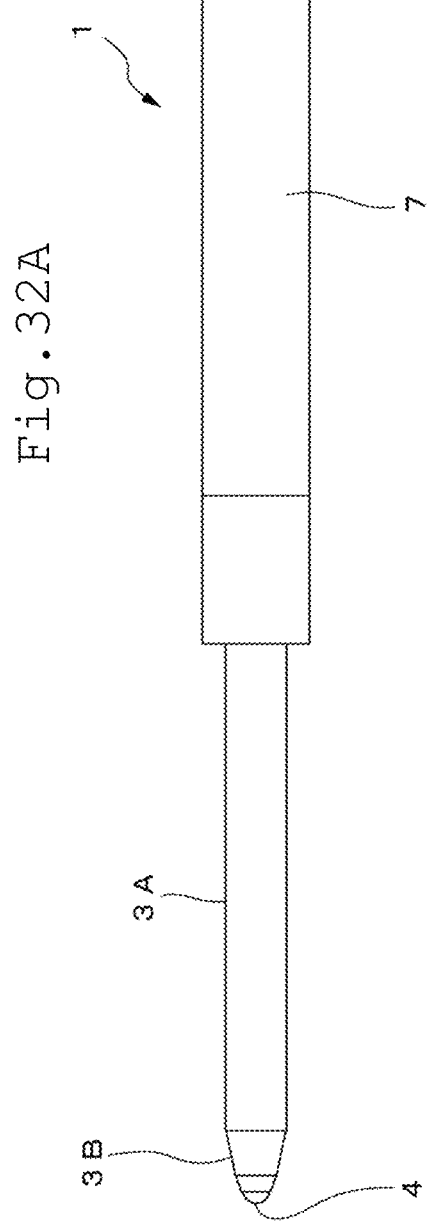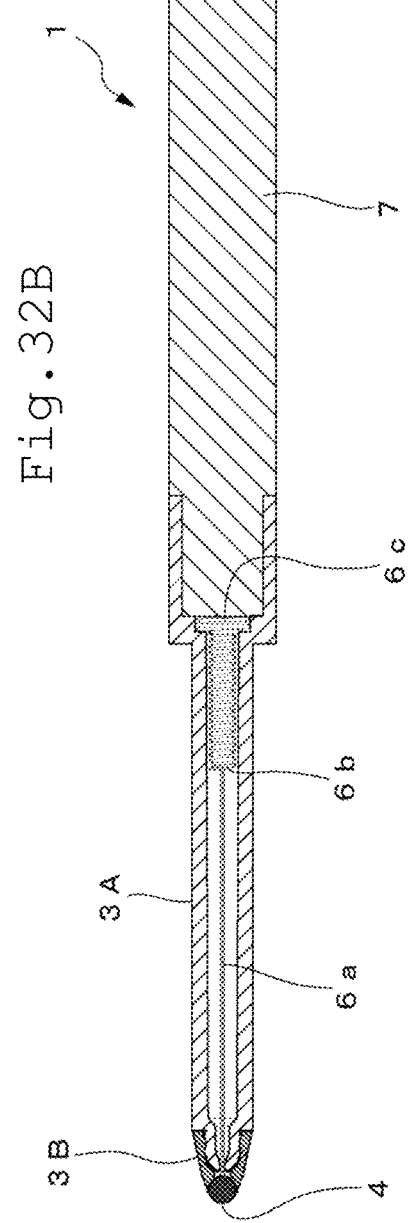

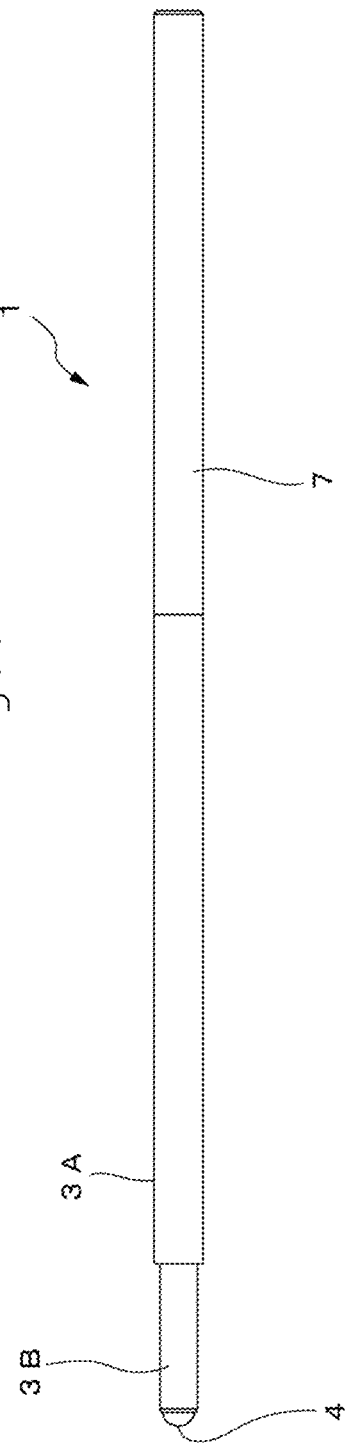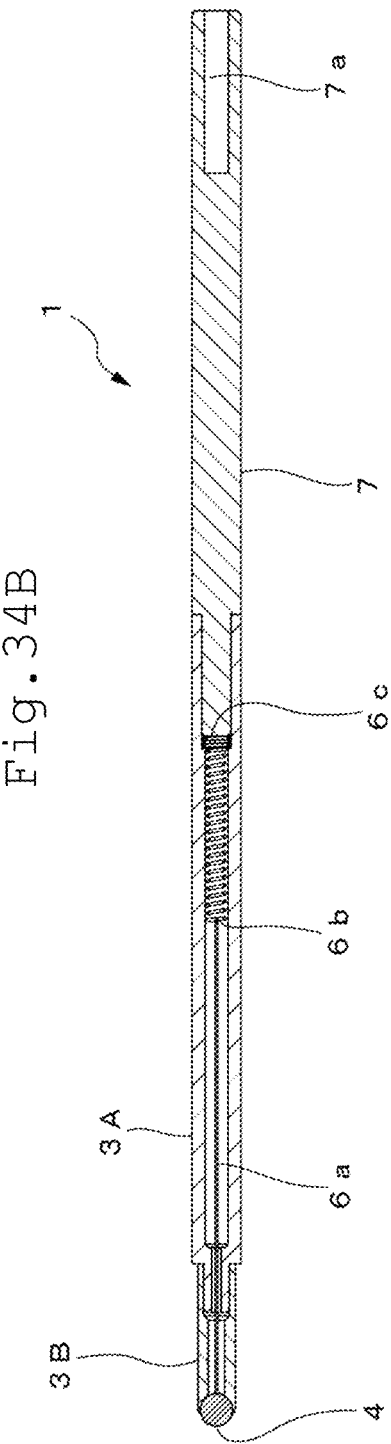

STYLUS PEN

TECHNICAL FIELD

The present invention relates to a stylus pen for inputting coordinate information to a capacitive pointing device.

BACKGROUND ART

In recent years, portable information terminal devices such as smartphones and tablet PCs, which have rapidly become widespread, employ a pointing device capable of specifying a coordinate to be inputted by touching with a fingertip. A touch screen is constituted by integrally combining the pointing device with a liquid crystal display panel, for example.

In addition, in order to enable t specify coordinates by a light touch operation with a fingertip, for example, in association with a display image on a touch screen, a projected-type capacitive pointing device is often adopted.

The basic principle of the projected-type capacitive pointing device will be described in detail based on FIGS. 35 and 36. As shown in FIG. 35 of a disassembled oblique view, for example, a capacitive pointing device 30 includes a transparent insulating film 33 on the backside of which an indium-tin-oxide film (ITO film) 31 is formed having a plurality of electrodes for detection of coordinate in Y-direction and on the front side of which an ITO film 32 is formed having a plurality of electrodes for detection of coordinate in X-direction.

On the ITO film 31, a plurality of rhombic electrode pads (sensing electrodes) 34, which are coupled in X-direction and electrically connected to each other, is arrayed in a plurality of rows in Y-direction, and on the ITO film 32, a plurality of rhombic electrode pads 35, sensing electrodes, which are coupled in Y-direction and electrically connected to each other, is arrayed in a plurality of rows in X-direction.

In a plan view of the insulating film 33 on which the ITO films 31 and 32 are formed, respective electrode pads 34 and 35 form a two-dimensional lattice-like structure arrayed in a plane with predetermined spacings, as shown in FIG. 36.

When, for example, a fingertip is brought into contact with the touch panel 30 via a protective cover glass (not shown) and the capacitance of the electrode pad 34 at the contact position among the electrode pads 34 connected in the X-direction varies more than a predetermined value, then this enables to detect the position coordinate of Y-direction.

And when the capacitance of the electrode pad 35 at the contact position among the electrode pads 35 connected in the Y-direction varies more than a predetermined value, then this enables to detect the position coordinate of X-direction.

A stylus pen, less capable of staining the screen of a pointing device with fingerprints or the like, is also widely used for the capacitive pointing device 30.
Because with this stylus pen fine and precise input operation is possible compared to inputting by a fingertip, it is suitable for handwriting input of characters, signatures, illustrations, etc.

The stylus pen used for the capacitive pointing device 30 includes a barrel formed of a conductive material to be grasped by a user's hand and a screen contacting portion as a stylus tip formed of a conductive material similarly and attached to the tip end of the barrel, and the barrel and the screen contacting portion are electrically connected.

A number of proposals on stylus pens to be used for capacitive pointing devices have been made, and the present inventor also proposes stylus pens disclosed in Patent Literature 1 and 2.

In the stylus pen disclosed in Patent Literature 1, a screen contacting portion is made of conductive rubber material; the screen contacting portion is characterized in that the conductive rubber material is composed of a composite material being compounded with electro conductive carbon black, or powder or filament of metal into rubber material.

In the stylus pen disclosed in Patent Literature 2 a screen contacting portion is formed of a rubber material in which carbon nanotube is dispersed. This enables the volume resistivity of the screen contacting portion to be lowered and can provide a stylus pen capable of giving a good touch reaction at a low load pressure to the electrode pad even though the screen contacting portion is thin.

CITATION OF LIST

Patent Literature

Patent Literature 1: JP-A-1998-161795
Patent Literature 2: JP-A-2016-91089

A stylus pen for capacitive pointing devices, included in the above described PTL 1 and PTL 2, employs a structure that a screen contacting portion as a pen tip is provided at a tip end of a cylindrical-shaped barrel, or that a screen contacting portion is provided at a tip end portion of a mouth tip that is formed to have a conical shape at a tip end of a barrel.

The cone-shaped mouth tip is often formed of a material having a similar conductivity as the barrel.

Erroneous recognition of a touched point hardly occurs when pointing operation with a stylus pen is performed at a right angle to the pointing device surface. However, when the pointing operation is performed at a tilted angle by a predetermined value or more from the right angle, a problem arises that erroneous recognition occurs by reaction with neighboring electrode pads other than the pointed one.

This is because the more tilted the stylus pen, the closer to the electrode pad is the conductive barrel or the cone-shaped mouth tip, both of which have a larger area compared with the screen contacting portion; then the influence of capacitive coupling on the neighboring electrode pad becomes more significant.

In order to solve the above technical problem, the main issue of this invention is to provide a stylus pen that allows to input coordinate information accurately to the pointing device and to improve operationability.

SUMMARY OF THE INVENTION

A stylus pen according to the present invention to solve the above-described problem is a stylus pen for inputting information by contacting a screen contacting portion of the stylus pen to a capacitive pointing device.
This stylus pen is characterized in that the stylus pen includes
a barrel, a holder formed of non-conductive material attached to a front end of the barrel, a screen contacting portion formed of conductive material attached to a front end of the holder, and a connecting member made of conductive material being disposed in the holder and having a resilient action in an axial direction of the barrel, a front end of the connecting member being in contact with the screen contacting portion to conduct electricity, wherein an outer diameter of the connecting member perpendicular to the axial direction is set to be smaller as compared to an outer diameter of the screen contacting portion perpendicular to the axial direction.

In this case, the screen contacting portion is a spherical body containing carbon material, and an outer diameter of the sphere is desirably formed in a range from 1 mm to 3 mm.

In a favorable embodiment, the barrel is formed of conductive material and a structure is employed that a rear end of the connecting member is connected to the barrel.

In another favorable embodiment, a structure is employed that the barrel has a holding portion made of conductive material provided at a front end and a rear end of the connection member is connected to the holding portion. In still another favorable embodiment, a conductive layer is formed on the barrel and a structure is employed that the conductive layer is capacitively coupled with the connection member.

The connecting member includes a conduction part having a linear rod in contact with the screen contacting portion, a spring portion having a coil-wound portion connected to the conductive portion and a fitting portion connected to the spring portion, wherein a structure is employed in which an outer diameter of the conductive portion perpendicular to an axial direction is set to be smaller as compared with an outer diameter of the screen contacting portion perpendicular to the axial direction.

In this case, the fitting portion is made to have a larger outer diameter than that of the coil-wound portion of the spring portion and is desirably fitted and attached to an annular recess formed by utilizing the rear end of the holder.

The tip end of the holder holding the screen contacting portion is desirably configured to be located closer to the axis of the holder than a tangent line connecting the screen contacting portion and the holder.

A configuration is also preferably employed where a second screen contacting portion is disposed at the rear end of the barrel, the top part of which is made of a conductive material and formed to a convex surface.

According to the above-described stylus pen according to the present invention, the outer diameter of the connecting member, conductive to the screen contacting portion, perpendicular to the axial direction is set to be smaller as compared with the outer diameter of the screen contacting portion perpendicular to the axial direction of the barrel disposed at the tip end.

This makes it possible to reduce the degree that the connecting member is capacitively coupled to the electrode pad of the pointing device even when the touch operation is performed with the stylus pen tilted to a certain degree with respect to the pointing device. Therefore, it is possible to solve the problem that part of the stylus pen reacts to electrode pads other than the target electrode pad to cause erroneous recognition.

Since, in this case, a connecting member made of a conductive material having a resilient action in the axial direction is mounted with abutting on the screen contacting portion, the contact state of the connecting member with the screen contacting portion can always be kept excellent, even when the stylus pen is accidentally dropped.

Thus, it is possible to provide a stylus pen that can ensure the reliability of operation for a long time.

Further, according to one preferred form of the stylus pen according to the present invention, the connecting member includes a conductive portion formed of a linear rod abutting on a screen contacting portion, a spring portion to which a coil-wound portion is formed connected to the conductive portion, and a fitting portion, connected to the spring portion, having an outer diameter larger than that of the coil-wound portion.

Then, a configuration is adopted in which the fitting portion is fitted and mounted in an annular recess formed by utilizing a rear end portion of the holder.

Thus, when the holder is mounted on the barrel, or when the holder is mounted on the holding part attached to the front end of the barrel, the holder is fitted and attached into the annular recess simultaneously formed at the rear end of the holder.

Thus, the ease of assembling the stylus pen can be ensured.

BRIEF DESCRIPTION OF THE DRAWINGS

FIGS. 1A and 1B show a whole configuration of a first embodiment of a stylus pen according to the present invention; FIG. 1A is an elevation view and FIG. 1B is a central cross-section view;

FIG. 2A is a perspective view and FIG. 2B is central a cross-section view;

FIGS. 7A and 7B show the whole configuration of a second embodiment of the stylus pen according to the present invention; FIG. 7A is an elevation view and FIG. 7B is a central cross-section view;

FIGS. 16A, 16B, 16C, and 16D show an appearance composition of a third embodiment of the stylus pen according to the present invention; FIG. 16A is a plan view, FIG. 16B is an elevation view, FIG. 16C is a bottom plan view, and FIG. 16D is a rear view;

FIG. 20A is an elevation view.

FIGS. 31A and 31B show an overall composition of a fourth embodiment in which a single stylus pen is used as a knock-type writing instrument; FIG. 31A is an elevation view and FIG. 31B is a central cross-section view;

FIGS. 32A and 32B show a composition of the single stylus pen of the fourth embodiment; FIG. 32A is an elevation view and FIG. 32B is a central cross-section view;

FIG. 33A is an elevation view and FIG. 33B is a central cross-section view;

FIGS. 34A and 34B show a composition with a single stylus pen of the fifth embodiment; FIG. 34A is an elevation view and FIG. 34B is a central cross-section view;

Figure 2A:
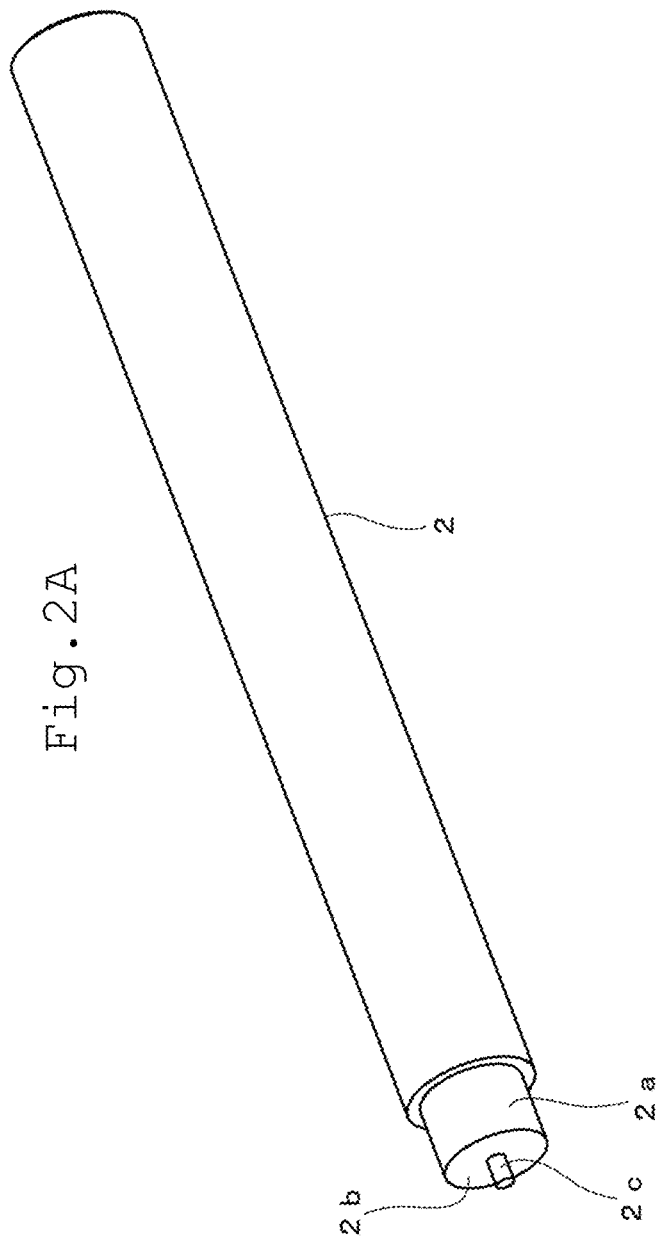
FIGS. 2A and 2B show parts configuration of a barrel of the first embodiment.

A stylus pen according to the present invention will be described on the basis of embodiments illustrated in the drawings.

It should be noted that in the following drawings the same reference numerals are given to the same or corresponding parts. In part of drawings, however, due to limitations of space, reference numerals are given to a representative part and a detailed composition may be described with reference to numerals given to a drawing for each part.

In addition, in the following description of the embodiments, with respect to a stylus pen and component parts, definitions are given that "a front direction" or "a tip end" or "a front end" indicates "the direction" or "the end portion" where a screen contacting portion 4 as a pen tip is provided that is to be described later, and "a rear direction" or "a rear end" indicates "the direction" or "the end portion" opposite to the screen contacting portion.

FIGS. 1A and 1B through FIG. 6 illustrate a stylus pen of a first embodiment, and FIGS. 1A and B respectively show an elevation view and a central cross-section view. The stylus pen 1 of the first embodiment provides a conical holder 3 at the front end of a barrel 2 as a holding portion. A screen contacting portion 4 as a pen tip is attached to the tip end of the holder 3. Further, a tail plug 5 is fitted to the rear end of the barrel 2.

Figure 2B:
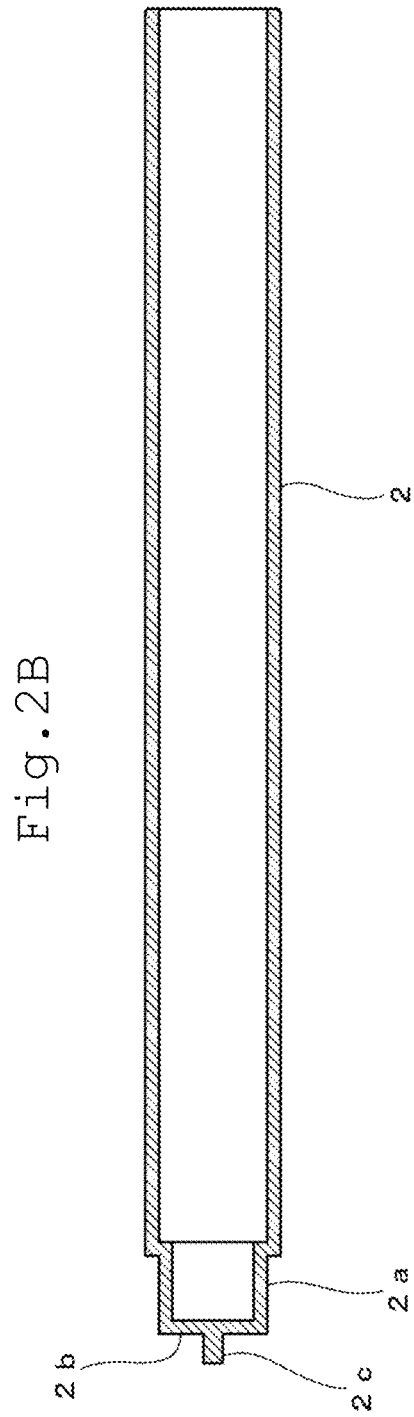

As shown in FIG. 2, the barrel 2 is formed to a cylinder shape as a whole and at the front end thereof a diameter-reduced portion 2a whose outer diameter is slightly reduced is formed, and a closed face 2b is formed at the front end of the diameter-reduced portion 2a, so as to be perpendicular to the axial direction. A small columnar protrusion 2c is formed normal to and at the center of the closed face. That is, the small columnar protrusion is formed to coincide with the axial direction of the barrel 2. The small protrusion 2c may be a recessed form, not protruded from the closed face 2b.

Further, the barrel 2 is made of a conductive material that may be a resin material, for example, in which carbon black is dispersed, and the barrel can be formed by injection.

Figure 3:
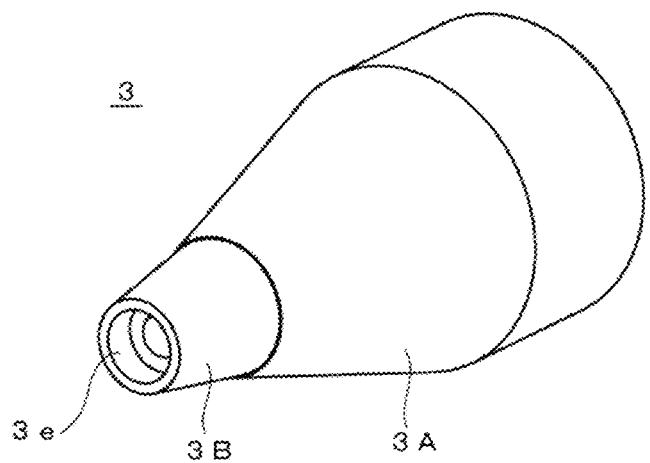
FIG. 3 is a perspective view of a holder of a screen contacting portion of the first embodiment.
Figure 4:
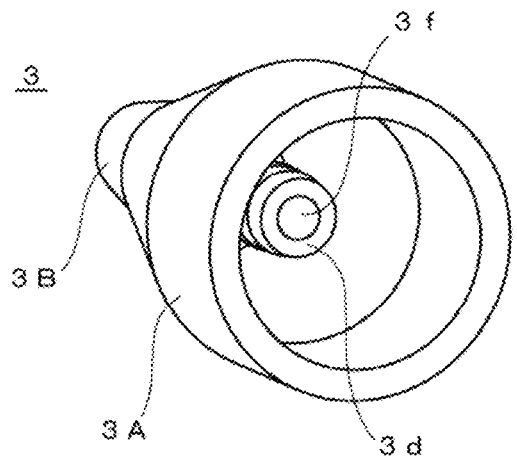
FIG. 4 is a perspective view seen from another view point of the holder of the screen contacting portion of the first embodiment.
Figure 5:
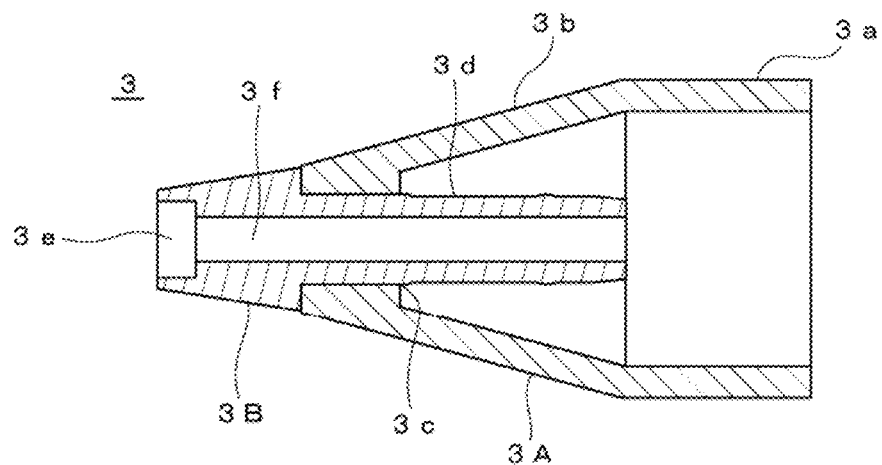
FIG. 5 is a central cross-section view of the holder of the screen contacting portion of the first embodiment.

FIG. 3 through FIG. 5 show a holder 3 to support the screen contacting portion 4 at the front end of the holder; in the first embodiment, the holder 3 is composed of a first holder 3A and a second holder 3B.

The first holder 3A is formed by integrally forming a cylindrical portion 3a and a conical portion 3b and is attached to the barrel 2 by fitting the diameter-reduced portion 2a of the barrel 2 into an inner surface of the cylindrical portion 3a. The conical portion 3b has an opening 3c formed along an axial direction at the tip end, and a barrel portion 3d of the second holder 3B is fitted and attached to the opening 3c.

The tip end of the second holder 3B is formed in a conical shape so as to be continuous with the tapered surface of the conical portion 3b, and a supporting hole 3e to which the screen contacting portion 4 as a pen tip is to be inserted is formed.

Further, a hole 3f penetrating the barrel portion 3d, communicating with the supporting hole 3e, is formed, and the inner diameter of the hole 3f is formed slightly smaller than the opening diameter of the supporting hole 3e, and the hole 3f is formed in a straight manner.

Figure 6:
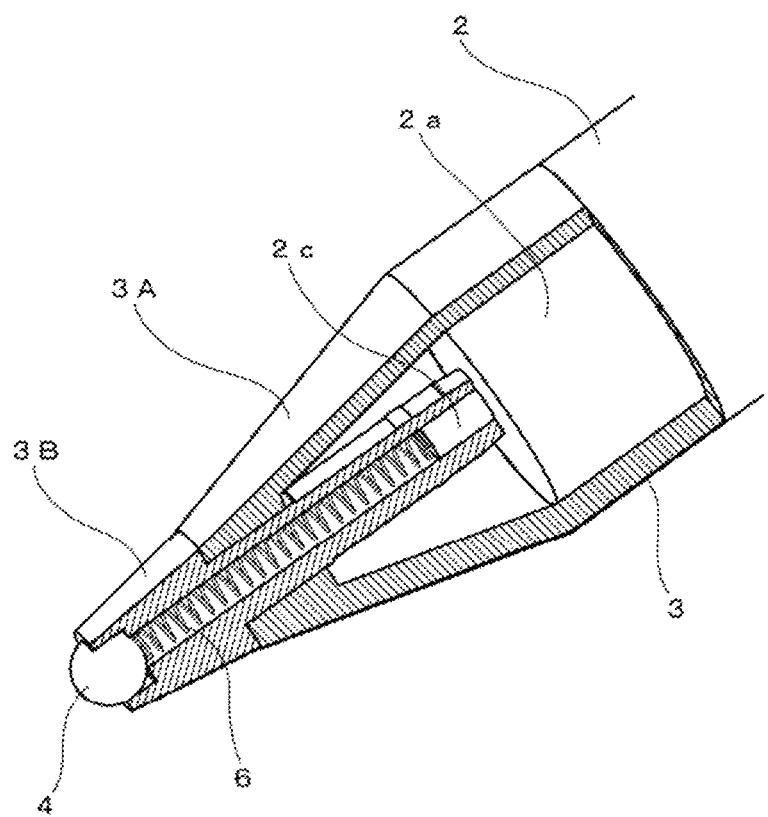
FIG. 6 is a partially-cutaway perspective view of a tip end portion of the stylus pen of the first embodiment.

In addition, as shown in FIGS. 1 and 6, a small protrusion 2c of the barrel 2 is set to be inserted to the rear end of the hole 3f in a state where the cylindrical portion of the holder 3 is fitted and attached to the diameter-reduced portion 2a of the barrel 2.

In the example shown in the FIGS. 1 to 6, the first holder 3A and the second holder 3b are separately formed of an insulating resin material such as polyacetal resin (POM), but the holder 3 may be formed by integrally forming the first holder 3A and the second holder 3B.

As shown in FIG. 6, the screen contacting portion 4, which is formed to be a spherical body, or a ball, and conductive, is press-fitted to the supporting hole 3e of the holder 3.

The screen contacting portion 4 desirably has characteristics of a certain degree of self-lubrication, a low coefficient of friction, and excellent mechanical strength so as to be smoothly slidable in contact with the capacitive pointing device.

For example, a carbon ball can be adopted which is obtained by mixing and stirring carbon powder such as graphite and carbon black to thermosetting resin such as furan resin, phenol resin, or imide resin, and forming into a spherical body and sintering.

By using carbon balls described above as the screen contacting portion 4, it is possible to reduce the degree of scratching the pointing device, and to perform a smooth sliding operation on the pointing device surface; this allows to provide a stylus pen with improved operability. When stylus pen 1 is held vertically and moved at a moving speed of 3.3 m/min with a load of 1.5 N, a suitable feeling of operation can be achieved by setting a coefficient of friction with the glass screen surface, in case of iPhone 6s, a registered trademark, to be in a range of 0.1 to 0.2.

And as shown in FIG. 6, between the screen contacting portion 4 having a ball shape and the small protrusion 2c formed at the tip end of the barrel 2, a coil spring as a connecting member 6 that electrically connects therebetween is intervened.

Namely, the coil spring as the connecting member 6 is housed in the hole 3f formed the holder 3, and disposed rectilinearly along the axial direction of the barrel 2. The barrel 2 and the ball-shaped screen contacting portion 4 are electrically connected through the resilient, expanding, action of the coil spring.

The outer diameter of the screen contacting portion 4 perpendicular to the axis direction of the barrel is preferably set to be smaller than the diameter of the connecting member 6 perpendicular to the axis direction of the barrel.

By setting the diameters of the screen contacting portion and the connecting member to have the above relationship, the degree of capacitive coupling of the connection member with the electrode pads of the pointing device can be reduced even when a touch operation is performed with tilting the stylus pen 1 to the pointing device to a certain degree. Thus, a problem can be largely eliminated that the conductive member of a part of the stylus pen reacts with electrode pads other than the targeted pad to cause erroneous recognition.

In the first embodiment, the outer diameter of the ball-shaped screen contacting portion 4 is 2.5 mm and the outer diameter of the coil spring as a connecting member 6 that electrically connects the screen contacting portion 4 to the barrel 2 is 0.5 mm.

Further, the axial length of the coil spring as a connecting member 6 is 15 mm. The axial length is preferably set to be 10 mm or more, and with such a structure a problem can be eliminated that a part of the stylus pen reacts with electrode pads other than the targeted pad to cause erroneous recognition.

Meanwhile, the outer diameter of the ball-shaped screen contacting portion 4 described above is preferably set in a range of 1 to 3 mm. If the diameter is less than 1 mm, capacitive coupling with the touch screen is insufficient, and it is difficult to give a touch response to a sensor electrode. If the reaction sensitivity of the sensing electrode is enhanced to compensate this, the probability of causing erroneous recognition of the electrode pad increases.

If the diameter of the screen contacting portion 4 exceeds 3 mm, the visibility of the tip end of the screen contacting portion 4 decreases when touching the screen, and touch response is given to a plurality of sensing electrodes; therefore, positional resolution decreases when a pointing device is used as a writing inputting device.

As described above, the stylus pen according to the first embodiment allows to accurately input coordinate information to a capacitive pointing device and a stylus pen with increased operationability can be provided, and effects described in the paragraphs of effects of the invention can be obtained.

In the embodiment described above, the barrel 2 is formed of resin material to which carbon black, for example, is dispersed, but may be made of a metal material such as aluminum alloy.

A carbon ball is used for the screen contacting portion 4 as a pen tip, but a metal ball can be used instead of the carbon ball. Further, a coil spring is used as a connecting member 6 electrically connecting the screen contacting portion 4 to the barrel 2, but a conductive rubber rod having a resilient action along the axial direction can be used instead of the coil spring.

FIG. 7 to FIG. 15 show a stylus pen according to a second embodiment, and FIGS. 7A and 7B show the whole configuration of a second embodiment; FIG. 7A is an elevation view and FIG. 7B is a central cross-section view. The barrel 2 of the stylus pen of the second embodiment is composed of a barrel body 2A and a holding portion 2B attached to a tip end of the barrel body 2A. A holder 3 whose tip end is formed to be a cone shape is attached to the holding portion 2B and a screen contacting portion 4 as a pen tip is attached. The barrel body 2A is formed of resin material, and the holding portion 2B is made conductive by forming with a carbon-black-dispersed, for example, resin material.

Figure 8:
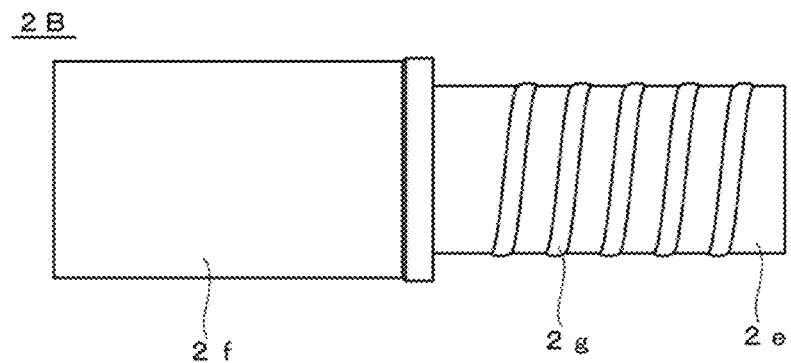
FIG. 8 is an elevation view of a holding portion of the second embodiment.
Figure 9:
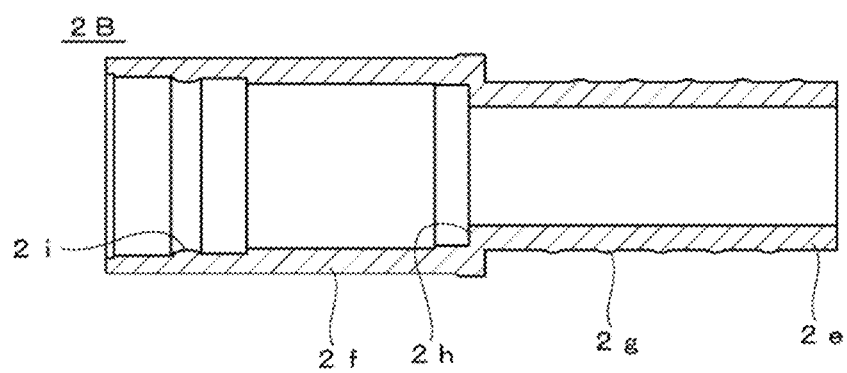
FIG. 9 is a cross-section view of the holding portion of the second embodiment.
Figure 10:
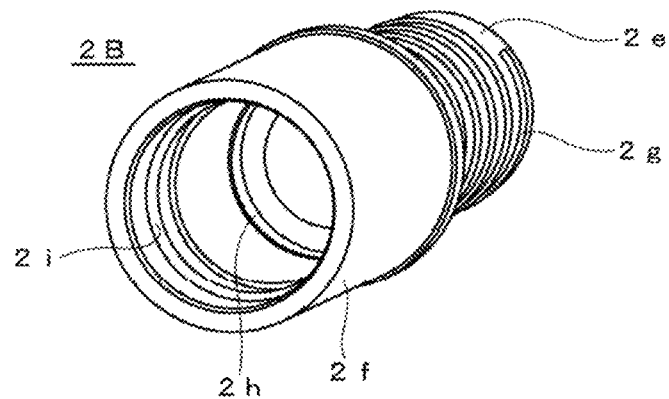
FIG. 10 is a perspective view of the holding portion of the second embodiment.

As shown in FIG. 8 to FIG. 10, the holding portion 2B is entirely formed cylindrical, and a rear part forms a smaller diameter portion 2e, and a front part forms a larger diameter portion 2f. A male screw thread 2g is formed on a circumferential surface of the smaller-diameter portion 2e.

A step 2h for reducing the inner diameter is formed at a boundary portion of the larger-diameter portion 2f and the smaller-diameter portion 2e on the inner surface of the holding portion 2B. The step 2h has a function of fitting and locking a fitting portion (seat winding part) 6c, described later, of the connecting member 6 formed of metal wire.

A rib 2i for fitting protruding inward annularly is formed in an opening of the larger-diameter portion. The rib 2i has a function of fitting and locking a first holder 3A described later.

Figure 15:
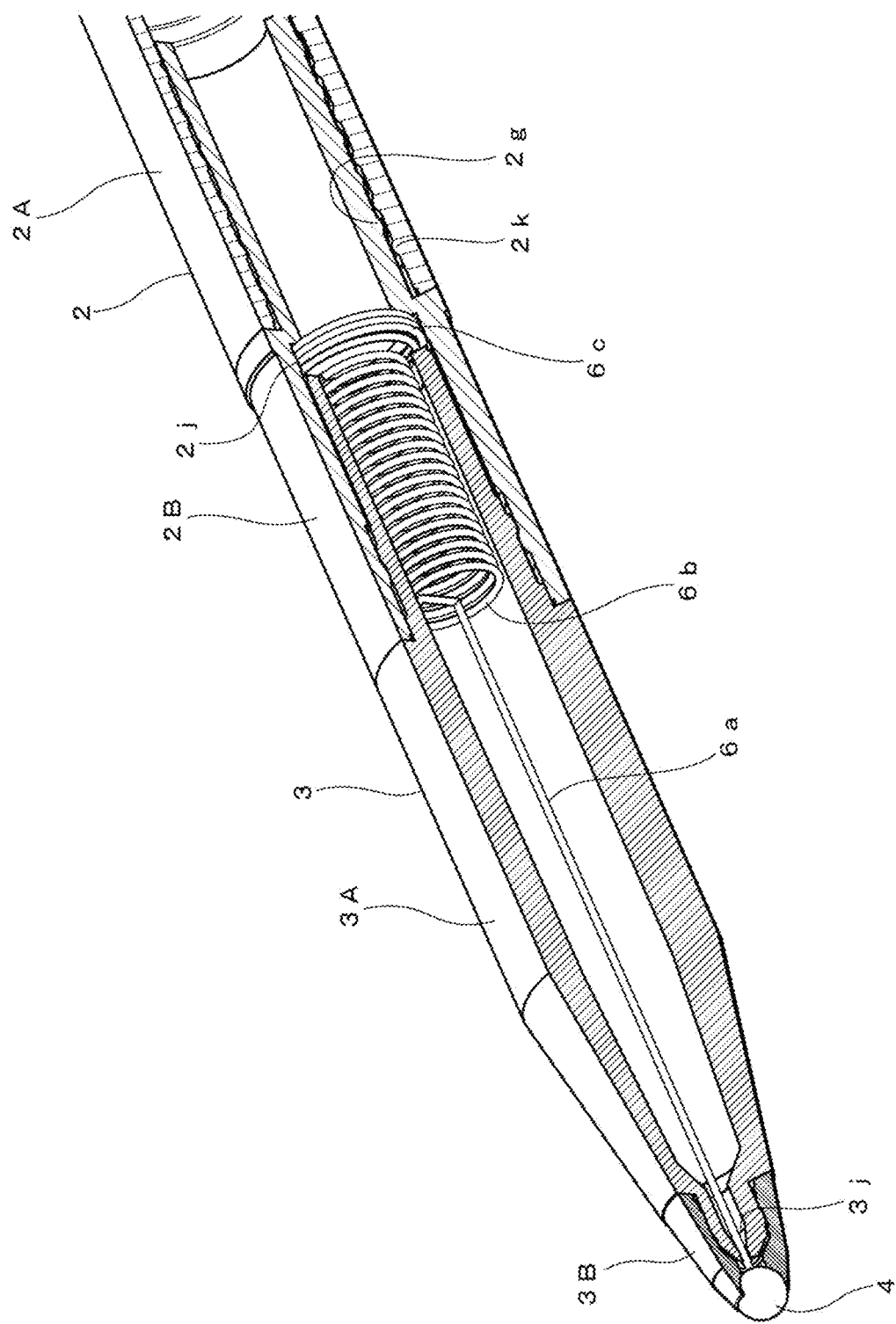
FIG. 15 is a partially-cutaway perspective view of a tip end portion of the stylus pen of the second embodiment.

A female screw thread 2k is formed in an inner surface of a front end of the barrel body 2A, as shown in FIG. 7 and FIG. 15. The barrel body 2A and the holding portion 2B are connected to construct the barrel 2 by screwing the male screw thread 2g formed in the barrel body 2B with the female screw thread 2k.

Though in this embodiment the barrel body 2A and holding portion 2B are made as separate parts, the barrel 2 that is conductive entirely can be made by integrally forming of material to which carbon black, for example, is dispersed.

Figure 11:
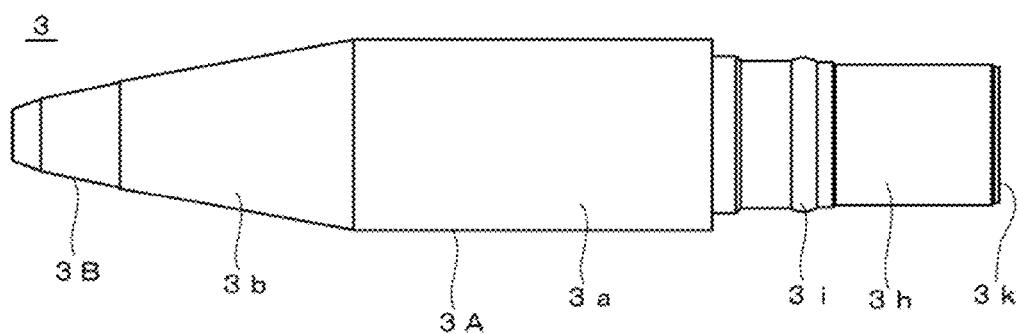
FIG. 11 is a perspective view of a holder of a screen contacting portion of the second embodiment.
Figure 12:
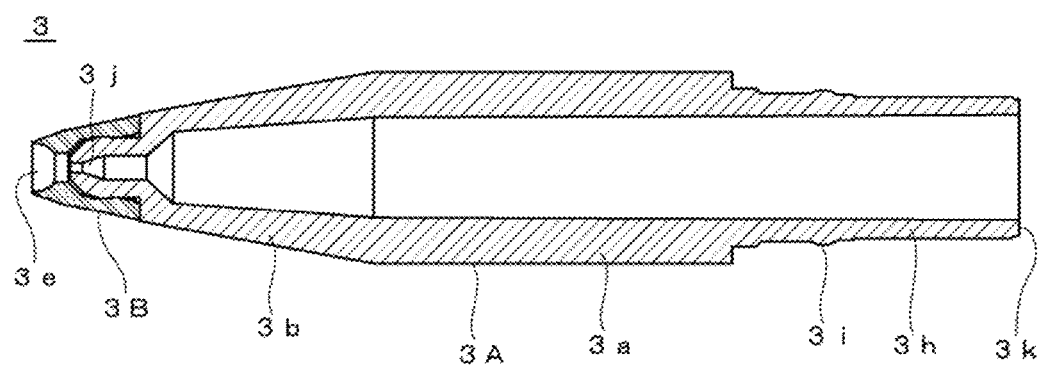
FIG. 12 is a central cross-section view of the holder of the second embodiment.
Figure 13:
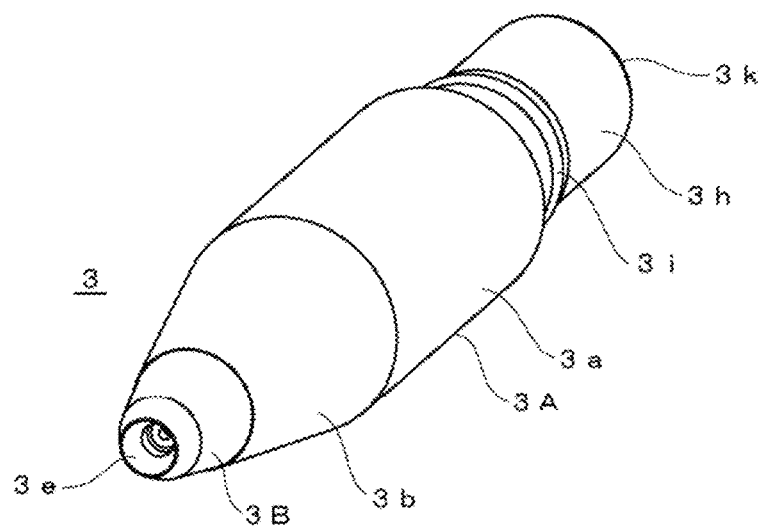
FIG. 13 is a perspective view of the holder of the second embodiment.

FIG. 11 to FIG. 13 show a holder 3 to support the screen contacting portion 4 and the holder 3, though having a different appearance, is composed of a first holder 3A and a second holder 3B, similar to the holder 3 of the first embodiment shown FIG. 3 to FIG. 5.

The first holder 3A is formed integrally with a central cylindrical portion 3a by forming a conical portion 3b in the front of the central cylindrical portion 3a and a cylinder portion 3h having a slightly smaller outer diameter in the rear, and the second holder 3B is fitted and attached at the front end of the conical portion 3b.

The second holder 3B is formed in a conical shape along the tapered surface of the conical portion 3b in the first holder 3A, and a supporting hole 3e into which the screen contacting portion 4 as a pen tip is fitted is formed at the tip end of the second holder 3B.

At the tip end of the first holder 3A, an axis hole 3j communicating with the supporting hole 3e is formed. The axis hole 3j is to be used for inserting the front end of the connecting member 6 described later.

Further, a rib 3i protruding annularly outward for fitting is formed on an outer circumferential surface of the cylinder portion 3h formed at the rear part of the first holder 3A. In the example shown in FIG. 11 to FIG. 13, the first holder 3A and the second holder 3B are separately made of an insulating resin material such as polyacetal resin, but the holder 3 may be made by integrally forming the holder 3A and the holder 3B.

Further, a conductive screen contacting portion 4 formed in a spherical body, or a ball, is press-fitted to the supporting hole 3e formed in the second holder 3B as shown in FIG. 7 and FIG. 15. The sphere-like screen contacting portion 4 is used which is similar to the screen contacting portion 4 used for the already described stylus pen in the first embodiment.

Figure 14:
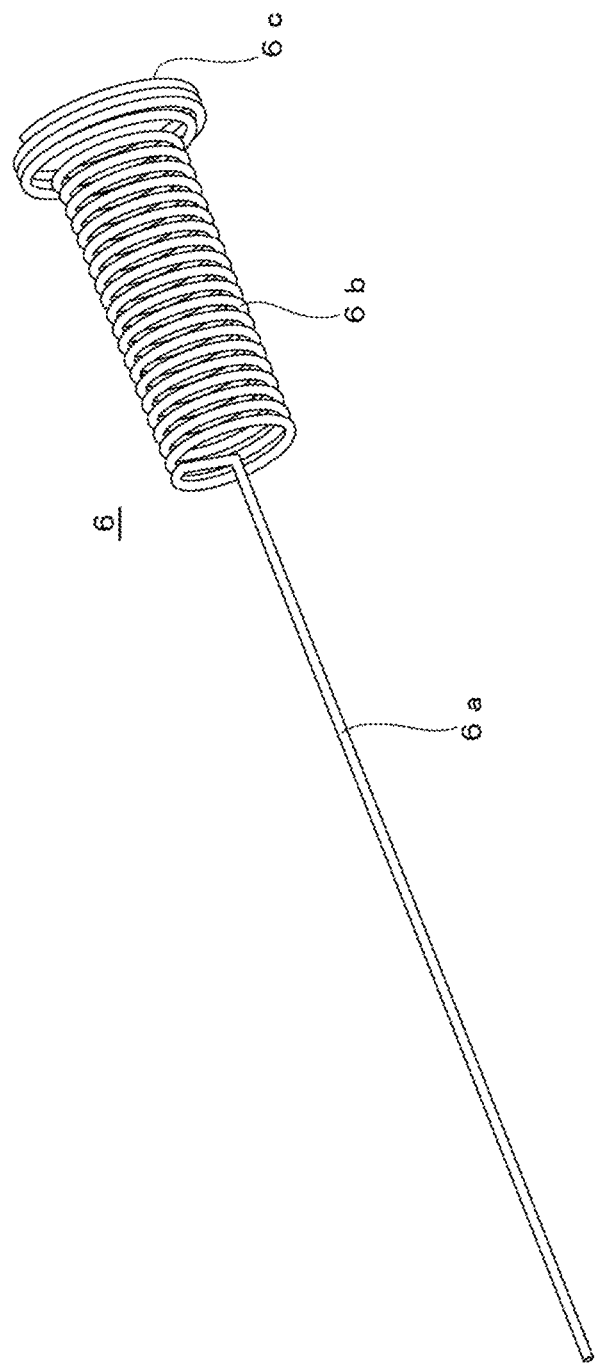
FIG. 14 is a perspective view of a connecting member of the second embodiment.

FIG. 14 shows a part constitution of connecting member 6. The connecting member 6 is formed of a single metal wire. The connecting member 6 includes a conductive portion 6a having a rectilinear rod shape whose tip end contacts to the screen contacting portion 4 to be electrically conducted, a spring portion 6b having a coil-wound portion connected to the conductive portion 6a, and a fitting portion (seat winding part) 6c connected to the spring portion 6b, the fitting portion (seat winding part) 6c having an annular shape whose outer diameter is made larger than the diameter of the coil-wound spring portion.

The conductive connecting member 6 is configured to electrically connect the holding portion 2B and the screen contacting portion 4.

In FIG. 7 and FIG. 15, a completed assembly of a stylus pen is shown, in which the connecting portion is mounted. A procedure of assembling a stylus pen of a second embodiment is described below using respective portions described individually.

First, as previously described, a spherical-body screen contacting portion 4 is press-fitted and attached to a supporting hole 3s that is formed in a second holder 3B of a holder 3 shown in FIGS. 11 to 13. In this state, a connecting member 6 is inserted from a rear opening of a first holder 3A with a conductive portion 6a of the connecting member 6 forward. With this procedure, a tip end of the conductive portion 6a abuts and is connected to the screen contacting portion 4 through an axial hole 3j shown in FIG. 12.

Then, a front end opening of the holding portion 2B shown in FIGS. 8 to 11 is fitted to cover a cylinder portion 3h that is formed at the rear side of the first holder 3A, and pushed toward the first holder 3A. With this procedure, an annular rib 2i formed inside of the opening of the holder 2B goes over an annular rib 3i formed on the cylinder portion 3h of the first holder 3A, and the first holder 3A is fitted to the holder 2B in an axial direction.

Then an annular fitting portion 6c formed at a rear side of the connection member 6 is fitted and attached to an annular recess 2j (See FIG. 7 and FIG. 15) formed between a step 2h (See FIG. 9) formed on an inner surface of the holding portion 2B and a rear end portion 3k of the first holder 3A.

A spring portion 6b of the connecting member 6 is located in the holding portion 2B, and due to a resilient (expanding) action of the spring portion 6b of the connecting member 6, the tip end of the rod-shaped conductive portion 6a abuts to the screen contacting portion 4. This abutment causes the screen contacting portion 4 as a pen tip and the holding portion 2B to be in a conducted state through the connecting portion 6.

Finally, a stylus pen in a state where the barrel body 2A and the holding portion 2B are connected shown in FIG. 7 is assembled by screwing a female screw thread 2k formed in the inner surface at the front end of the barrel body 2A (See FIG. 7 and FIG. 15) with a male screw thread 2g formed on a smaller-diameter portion 2e of the holding portion 2B.

A diameter of the metal wire composing the connecting member 6 in the second embodiment is 0.3 mm and a dimension (length) of the rectilinear conductive portion 6a of the connecting member 6 along the axial direction is set to 30 mm.

Meanwhile, the outer diameter of the sphere-shaped screen contacting portion 4 of the second embodiment is 2.5 mm as described before.

According to the second embodiment, therefore, the outer diameter (0.3 mm) perpendicular to the axis direction of the rod-shaped conductive portion 6a of the connecting member 6 is set far smaller compared to the outer diameter (2.5 mm) perpendicular to the axis direction of the screen contacting portion 4; consequently a degree of capacitive coupling between the conductive portion 6a of the connecting member and electrode pads of the pointing device can be reduced, even when touch operation is performed with tilting the stylus pen against the touch screen. This allows the problem to be largely eliminated that the connecting member 6 reacts with electrode pads other than the target to cause erroneous recognition.

As shown in the description above, also in a case of a stylus pen of the second embodiment according to the present invention, a stylus pen can be provided with which coordinate information can be accurately inputted to a capacitive-type pointing device and which can have improved operability.

In the second embodiment, the holding portion 2B is formed of resin material to which carbon black, for example, is dispersed, but one formed of metal material such as aluminum alloy can be used. Further, the holding portion 2B and the barrel body 2A can be integrally formed of metal material such as aluminum alloy.

Although the carbon ball is also used for the screen contacting portion 4 as the pen tip, it is the same as the touch pen of the first embodiment that a metal ball or the like can be used instead of the carbon ball.

FIG. 16 through FIG. 28 show a stylus pen of a third embodiment, and the stylus pen 1 of the third embodiment has a main construction that is the same as that of the stylus pen of the second embodiment shown in FIG. 7 through FIG. 15. Respective portions corresponding to the portions already described are assigned with the same reference numerals, and the detailed description thereof will be omitted.

FIG. 16 through FIG. 25 show some portions having slightly different from the second embodiment including the appearance and the main portions particularly different from the second embodiment will be described in the following.

FIG. 16A through FIG. 16D show each appearance of the stylus pen 1 of the third embodiment rotated three times by 90 degrees.

Figure 17:
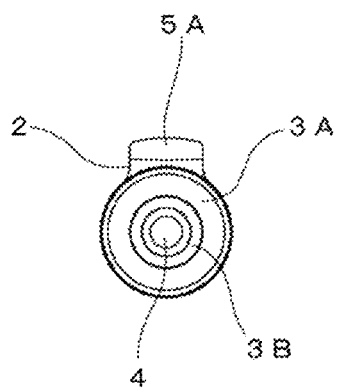
FIG. 17 is an enlarged left side view seen from the tip end of the third embodiment.
Figure 18:
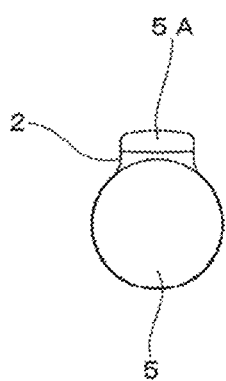
FIG. 18 is an enlarged right side view seen from the tail end of the third embodiment.
Figure 19:
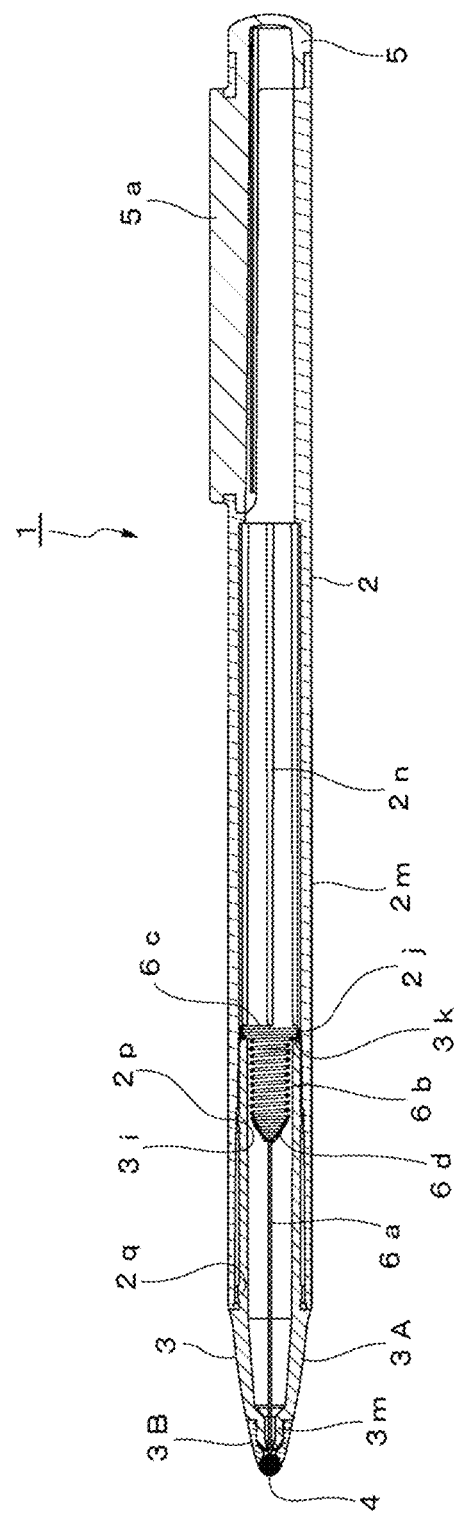
FIG. 19 is a central cross-section view of the third embodiment.
Figure 20A:
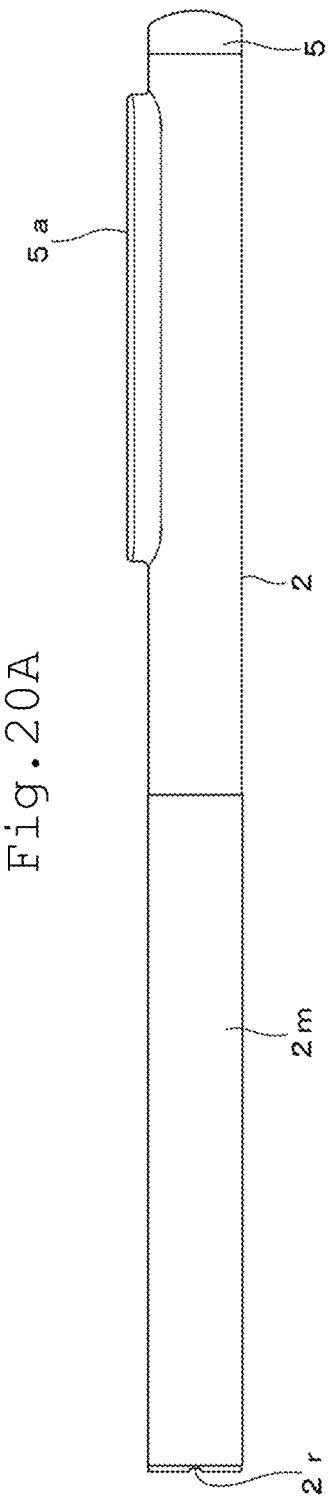
FIGS. 20A, B, and C show a part composition of the barrel.
Figure 20B:
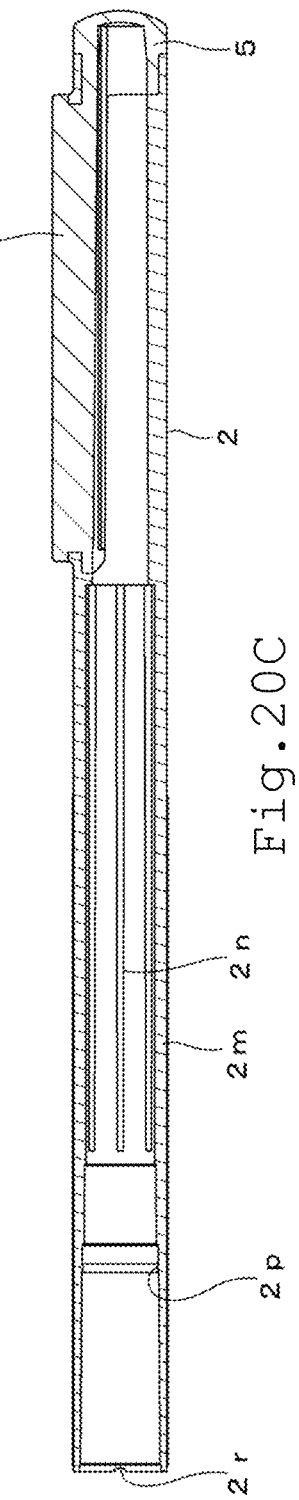
FIG. 20B is a central cross-section view.
Figure 20C:
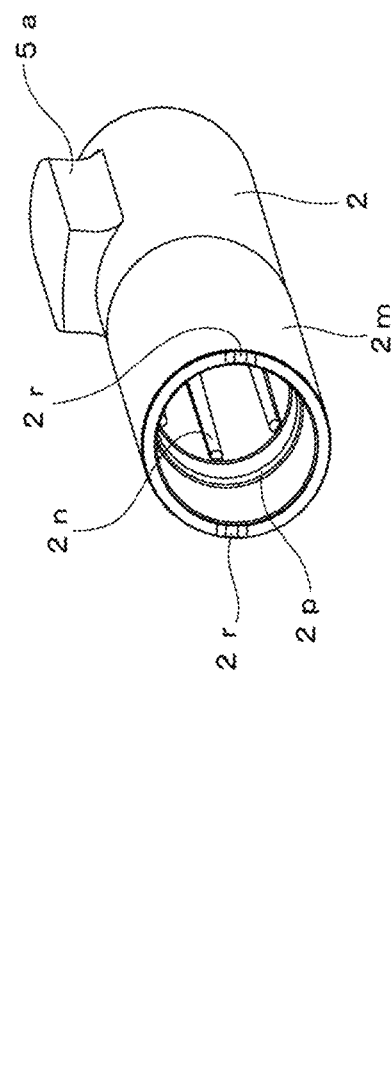
FIG. 20C is a perspective view seen from the front end of the third embodiment.

These figures show a basic six views of the stylus pen 1 of the third embodiment including FIG. 17 and FIG. 18. Further FIG. 19 is a central cross-section view of the stylus pen and FIG. 20 shows a structure of the single barrel of the stylus pen. The external configuration of the stylus pen 1 mainly will be described based on FIG. 16 through FIG. 20.

The stylus pen comprises a barrel 2 formed of an insulating material, ABS resin, for example, and as shown in a cross-section view in FIG. 19 an axially long decorative member 5a integrally formed with a tail plug 5 is attached at a rear end of the barrel 2. The tail plug and the decorative member 5a are formed of ABS resin, for example, having a different color from the barrel 2.

In this embodiment, two-color molding is employed to form the tail plug 5 and the decorative member 5a as a first side and the barrel 2 as a second side.

The decorative member 5a also plays a role of anti-rolling function, as the decorative member is formed to protrude axially long on the circumferential surface of the barrel 2.

A conductive thin film 2m, which is a conductive layer, is formed on the circumferential surface of the front half of the barrel 2, on which the conductive film 2m is composed by attaching an approximately 50 nm thick aluminum-deposited transfer film on which an acrylic resin layer with a thickness of 5 μm to 6 μm, a transparent resin layer, is formed to cover the aluminum-deposited transfer film. With this, the front half of the barrel 2 has a metallic luster design owing to the aluminum-deposited transfer film.

This conductive film 2m allows capacitive coupling between the user's finger and the connecting member 6 by intervening between the user's finger holding the barrel 2 and metal connecting member 6 being conducted to the screen contacting portion 4 as a pen tip housed in the barrel 2. This configuration contributes to an improvement of touch sensitivity to the sensing electrode with the stylus pen 1.

A holder 3, composing of a first holder 3A and a second holder 3B is attached to the front end of the barrel 2; the first holder 3A and the second holder 3B are made of an insulating resin material, such as polyacetal resin (POM). This configuration is the same as the configuration of the stylus pen 1 of the second embodiment shown in FIG. 7 through FIG. 15.

Figure 25:
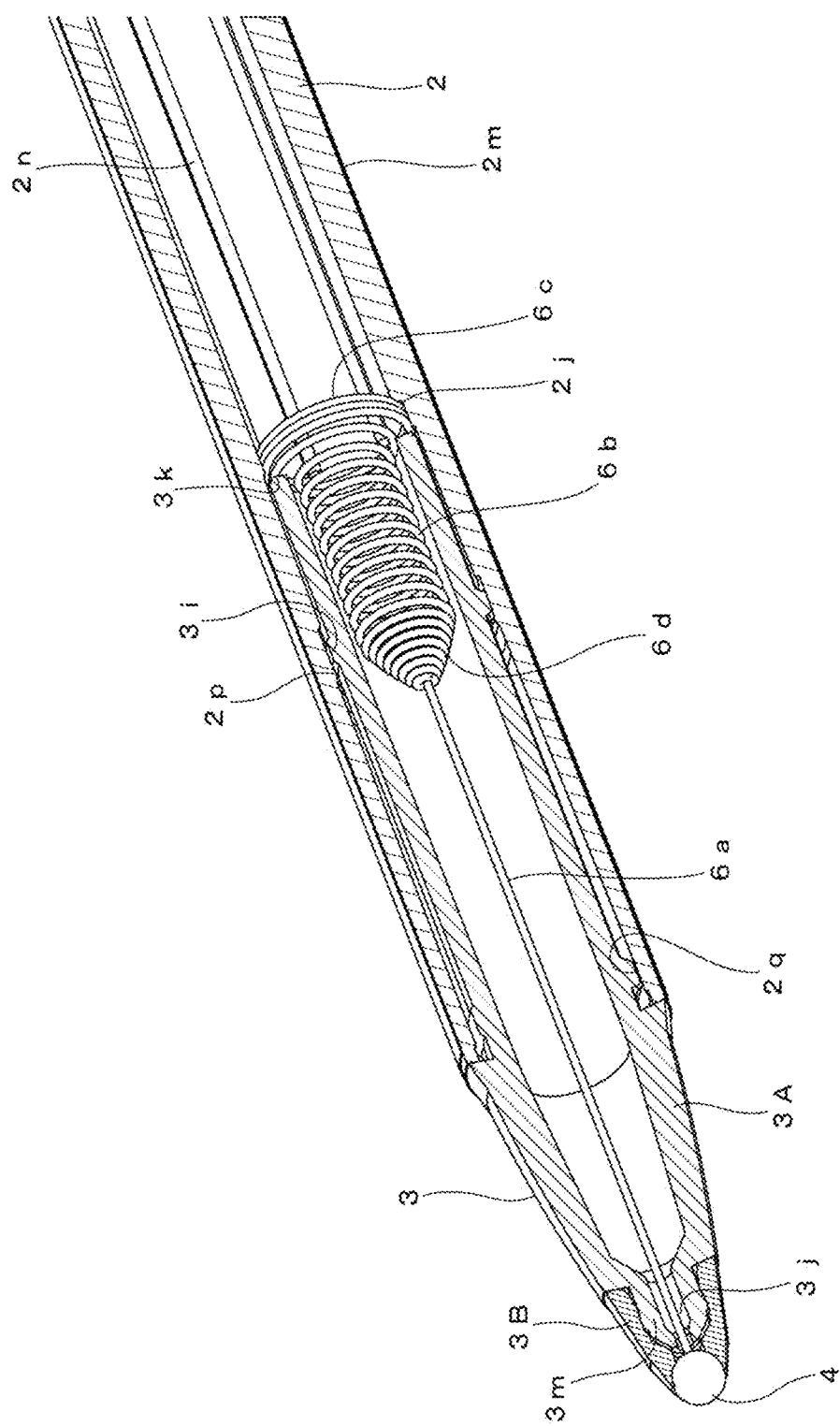
FIG. 25 is a partially-cutaway perspective view of a tip end portion of the stylus pen of the third embodiment.

As for the stylus pen 1 in the third embodiment, the holding portion 2B, which is used in the second embodiment, is not used, but the length of the portion of the first holder 3A to be inserted to the barrel 2 is elongated instead as shown in FIG. 19 and FIG. 25. The fitting portion 6c of the metal connecting member 6 is fitted and locked using the rea end of the holder 3k of the first holder 3A.

That is, a plurality of rectilinear ribs 2n are formed axially on an inner circumferential surface of the barrel 2 as shown in FIG. 19 and FIG. 20. The front end of the ribs 2n abuts on the fitting portion 6c of the metal connecting member 6 from backward, so that the fitting portion 6c of the metal connecting member 6 is fitted and attached in the annular recess 2j that is formed between the ribs 2n and the rear end of the holder 3k of the first holder 3A.

By adopting a structure that the fitting portion 6c of the connecting member 6 is pressed by the ribs 2n, the thickness of the barrel 2 can be formed to be thin, and thereby the weight of the barrel 2 can be reduced.

An annular rib 2p (See FIG. 19 and FIG. 20B) protruding toward the axis is formed on the inner circumferential surface of the barrel 2 between the front end of the barrel 2 and the rib 2n.

An annular rib 3i protruding outward formed on the first holder 3A gets over the annular rib 2p, thereby the first holder 3A is axially fitted and attached to the front end of the barrel 2.

On the first holder 3A, a second annular rib 2q (See FIG. 19 and FIG. 25) is formed and the second annular rib 2q functions to suppress the first holder 3A to rattle against the barrel 2 in a state where the first holder 3A is attached to the front end of the barrel 2.

Cutouts 2r are formed on opposing positions on the circumferential periphery on the front end of the barrel 2. These cutouts work as air venting holes when the first holder 3a is attached to the barrel 2.

Figure 21:
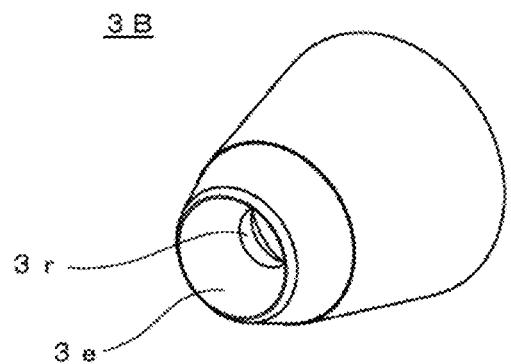
FIG. 21 is a perspective view seen from the front of a second holder of the third embodiment.
Figure 22:
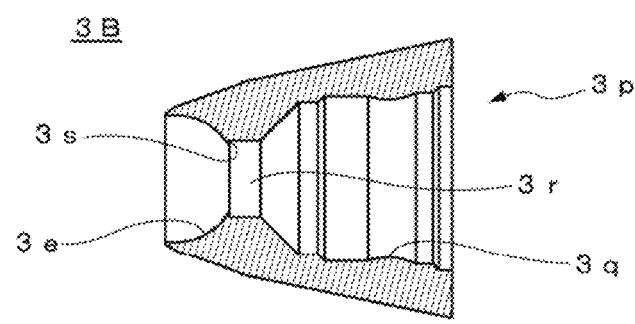
FIG. 22 is a central cross-section view of the second holder of the third embodiment.
Figure 23:
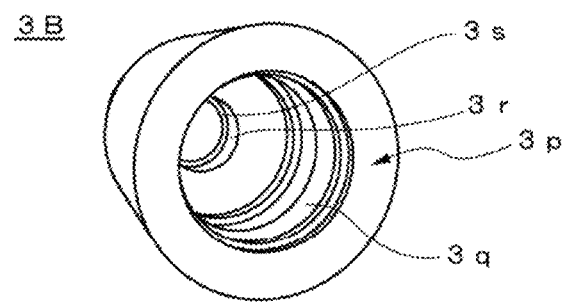
FIG. 23 is a perspective view seen from the rear of the second holder of the third embodiment.

FIG. 21 through FIG. 23 show the second holder 3B that supports the screen contacting portion 4 at the front end the second holder. The second holder 3B is fitted and attached to a protrusion 3m (See FIG. 19 and FIG. 25) that is formed by thinning the diameter of the front end of the first holder 3A. An axial hole 3j (See FIG. 25) is formed at the axial part of the protrusion 3m, and the axial hole is used for inserting the front end of the connection member 6.

The second holder 3B is formed to be conical with continuing from the tapered surface of the cone shape of the first holder 3A. The screen contacting portion 4 as a pen tip is attached to the tip end of the second holder 3B.

Although in the example shown in FIG. 21 through FIG. 23 a supporting hole 3e for housing the screen contacting portion 4 is formed at the tip end of the second holder 3B, the screen contacting portion 4 is desirably retained to be integrated by insert molding, for example, with the second holder 3B at a portion indicated as the supporting hole 3e of the second holder 3B.

In the third embodiment the screen contacting portion 4 is made of the same material and with the external appearance as those used for the first and second embodiment. The outer diameter of the ball-shaped screen contacting portion 4 of the third embodiment is 2.0 mm.

The second holder 3B has a fitting hole 3p whose inner diameter is reduced stepwise from the rear to the front, and inside the fitting hole 3p, an annular rib 3q protruding inward is formed, with which the second holder 3B can be fitted and locked to the protrusion 3m.

At the tip end of the fitting hole 3p, an opening 3r is formed to create a space between the back side of the screen contacting portion 4 retained by insert molding in the supporting hole 3n and the protrusion 3m inserted into the fitting hole 3p.

Figure 28:
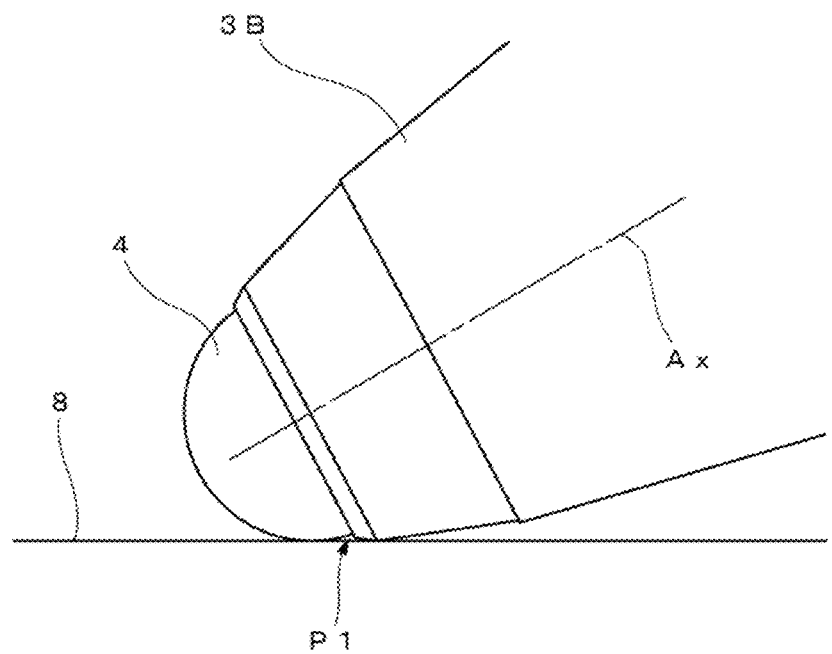
FIG. 28 is an enlarged view of the relation between the screen contacting portion and the holder.

Between the inner circumferential surface of the opening 3r formed in the second holder 3B and the screen contacting portion 4, a flat surface 3s is integrally formed with the second holder 3B perpendicular to the axis Ax of the second holder 3B (See FIG. 28).

The relation between the axis hole 3j of the first holder 3A, the opening 3r and the flat surface 3s of the second holder 3B will be described later on the basis of FIG. 26 and FIG. 27.

Figure 24:
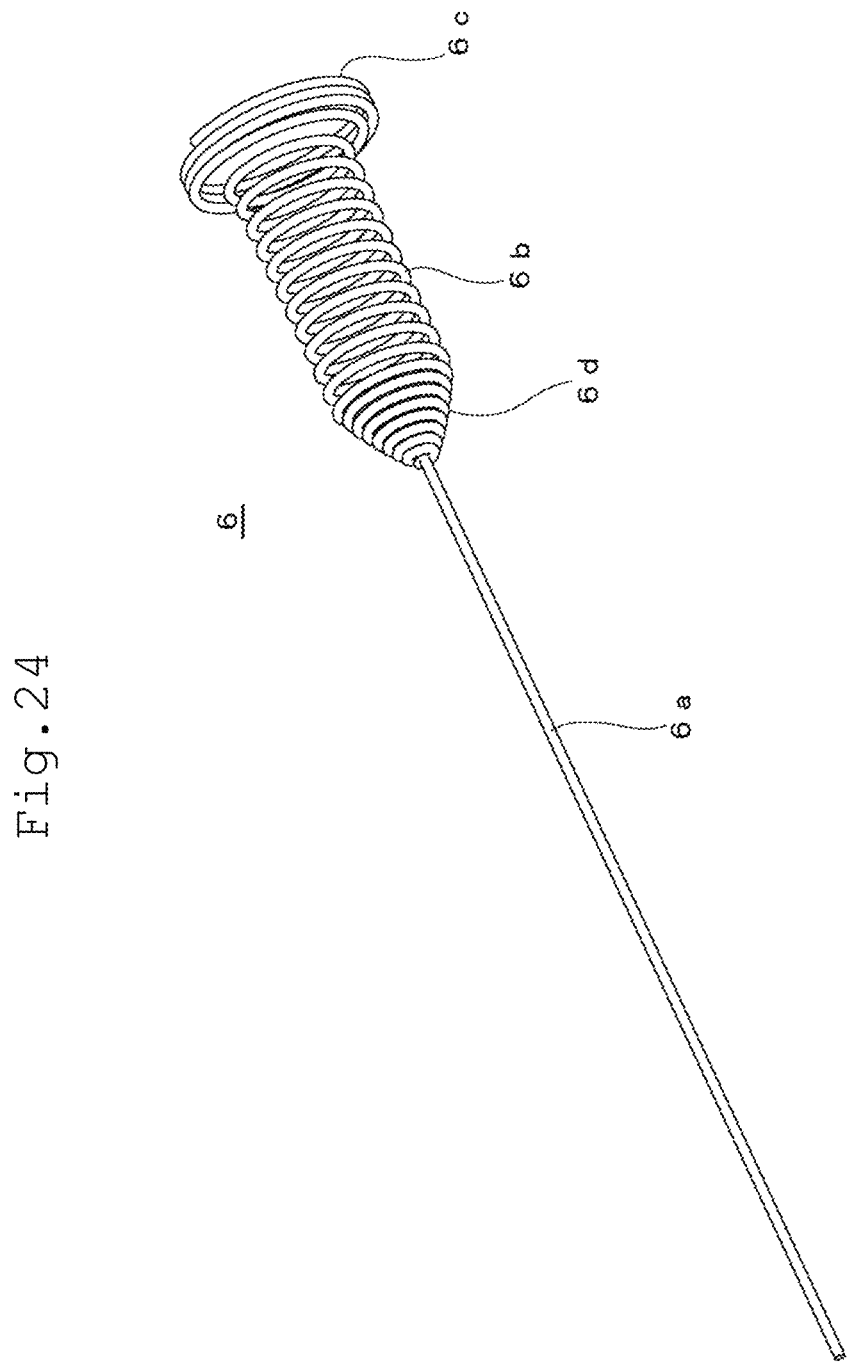
FIG. 24 is a perspective view of a connecting member of the third embodiment.

FIG. 24 show the structure of the connecting member 6 used in the third embodiment; the connecting member 6 is made of a single wire and a tapered portion 6d is formed between the rectilinear rod conductive portion 6a and the coil-wound spring portion 6b when compared to the connecting portion used in the second embodiment shown in FIG. 14.

The connecting member 6 is made of stainless steel wire with a diameter of 03 mm, the dimension in the axial direction, length, of the rectilinear conductive portion 6a is 31.0 mm, and the angle of the tapered portion 6d is set at 45 degrees with respect to the axis. The outer diameter of the spring portion 6b is 4.0 mm, the dimension of the spring portion in the axial direction is 8.15 mm, and the outer diameter of the fitting portion (seat winding part) 6c is set to be 6.0 mm.

The tapered portion 6d acts such that the spring portion 6b can be smoothly inserted to the first holder 3A with the conductive portion 6a forward when assembling the stylus pen.

Also in the third embodiment, the outer diameter (0.3 mm) of the rod conductive portion 6a perpendicular to the axis direction of the connecting member is set far smaller to the outer diameter (2.0 mm) perpendicular to the axial direction of the screen contacting portion 4, and this makes it possible to reduce the degree that the conductive portion 6a of the connecting member 6 is capacitively coupled to the electrode pad of the pointing device even when the touch operation is performed with the stylus pen 1 tilted to a certain degree with respect to the pointing device. Therefore, it is possible to solve the problem that part of the stylus pen reacts to electrode pads other than the target electrode pad to cause erroneous recognition.

A spring-pressing load to the screen contacting portion 4 due to the coiled spring portion 6b in the connecting member 6 is set to 0.26 N and a ball retaining load of the screen contacting portion 4 attached to the second holder 3B is set to approximately 5 N. That is, the rate of the spring-pressing load to the ball retaining load is 5.2%.

The rate of the spring-pressing load to the ball retaining load is desirably set to 50% at maximum, and preferably 30% of less such that separation of the screen contacting portion 4 from the second holder 3B, which means the screen contacting portion 4 is pushed out by the spring, is prevented for a long period of time.

Stainless steel is used as a material for the connecting member 6, a stainless steel member is shaped to a state shown in FIG. 24 and quenched by heat treatment to prevent the coiled spring 6b, in particular, from settling. It is conceivable to use other plated iron-based materials, for example, other than stainless steel; however, such iron-based materials, even if plated, are apt to be rusted at the tip end of the conductive portion 6a and this may increase the possibility of causing contact failure with the screen contacting portion 4.

In the stylus pen 1, therefore, stainless steel is desirably used as a material for the connecting member 6, as described above.

In designing the stylus pen 1, the coiled spring portion 6b of the connecting member 6 described above is useful for effectively absorbing variation of axial lengths of each member.

When the present embodiment is taken as an example, the ball-shaped screen contact portion 4, the second holder 3B, the first holder 3A, and the barrel 2 are connected in the axial direction from the tip end, and the connection member 6 exists over these four components.

When a tolerance assigned to each of the four members is ±0.05 mm, the maximum cumulative variation due to four members is ±0.2 mm (0.4 mm in a range).

Meanwhile, the connecting member 6 is designed with a variation in a length of ±1.0 mm, and therefore the total length variation, the maximum cumulative variation due to four members plus the length variation of the connecting member 6, becomes ±1.2 mm.

This variation due to four members and the connecting member 6, ±1.2 mm, is covered by the compression amount, a designed value of 2.0 mm, of the spring portion 6b of the connecting member 6. Then, when the total variation is within the range of the compression amount plus the total variation ±1.2 mm, the tip end of the connecting member 6 is surely in contact with the ball-shaped screen contacting portion 4, and electric conduction is ensured.

The spring constant of the connecting member 6 used for this stylus pen is 0.13 N/m and the self-weight of the connecting member 6 is 0.14 g. When the stylus pen 1 is held forward and the connecting member receives the self-weight, the variation of the connecting member 6, or the spring portion 6b, is 0.011 mm and the electrical conduction between the tip portion of the connecting member 6 and the ball-shaped screen contacting portion 4 is ensured.

In the above connecting member 6, the fitting portion 6c is adopted, having an enlarged outer diameter compared to the coiled spring portion 6b. The fitting portion 6c may have a reduced diameter compared to the coiled spring portion 6b due to the alteration of the attaching mechanism of the connection member 6.

Meanwhile, in the third embodiment, a configuration is adopted in which an aluminum-coated transfer film as a conductive thin film 2m is used on the front half of the barrel 2, and is covered with an acrylic layer. The present inventor prepared a plurality of samples whose barrel 2 is made of ABS resin in which the amount of carbon black is adjusted and compared the impedance characteristics of the barrels between the stylus pens using the samples and the stylus pen of the third embodiment according to the present invention.

The samples are prepared each of which has an amount of carbon black added to the resin with a relative ratio of 100% (sample 1), 75% (sample 2), 50% (sample 3), 25% (sample 4), and 0% (sample 5), respectively. Impedance characteristics are compared between stylus pens using the above samples and the stylus pen of the third embodiment.

Impedance is measured between the screen contacting portion 4 and at a position rearward from the screen contacting portion by 45 mm of the barrel 2 and is compared and evaluated.

As a result, the impedance of sample 1 is $1.0 \times 10^4 \Omega$, and that of sample 5 is $2.2 \times 10^5 \Omega$. The impedance of sample 2 to sample 4 falls within a range between the impedance of sample 1 and the sample 5, and the impedance obtained is corresponding to the amount of carbon black.

In contrast, the measured impedance of the third embodiment is $8.4 \times 10^4 \Omega$, and this confirms that impedance characteristics that the impedance is close or equivalent to the value of sample 2, $7.5 \times 10^4 \Omega$, is obtained.

It is confirmed that mechanical performance, such as strength, of the barrel 2 largely degrades when a large amount of conductive material, such as carbon black is added as in the case of sample 2. It is also confirmed that mechanical strength and electric performance, impedance, can be both achieved using a configuration adopted in the third embodiment.

In the third embodiment, an aluminum evaporated film is used as a conductive thin film 2m, but a conductive layer is not limited to this. Appropriate impedance characteristics can be similarly obtained by forming a highly thermal-conductive material, such as iron-based material, into a thin cylinder as material for the conductive thin film 2m.

Thermal conductivity of aluminum is 237 W/mK at 300 K, and that of iron is 80.3 W/mK, both cited from Handbook of Chemistry: Pure Chemistry, 4th ed., Edited by The Chemical Society of Japan, materials with thermal conductivity 10 W/mK or larger other than above can be preferably used as materials for the conductive layers above.

Figure 26:
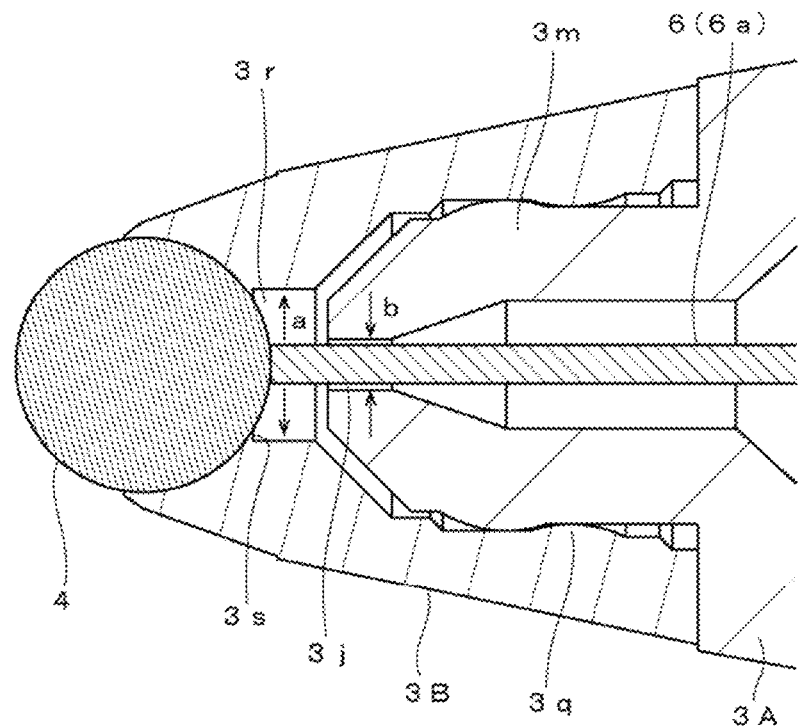
FIG. 26 is a partially-enlarged cross-section view of the tip end portion of the stylus pen of the third embodiment.

FIG. 26 is an enlarged cross-section view of the tip end of the stylus pen 1 in the third embodiment. The axis hole 3j through which the conductive portion 6a of the connecting member 6 connected to the screen contacting portion 4 passes and the opening 3r are respectively formed at the first holder 3A and the second holder 3B. The inner diameter of the opening 3r formed at the second holder 3B is larger than the inner diameter b of the axis hole 3j formed at the tip end of the first holder 3A.

With this configuration, the conductive portion 6a of the connecting member is put through the axis hole 3j having a small inner diameter at the first holder 3A and the tip end of the conductive portion 6a is accurately brought into contact with nearly the center of the backside of the ball-shaped screen contacting portion 4 through the opening 3r having a larger inner diameter of the second holder 3B.

Figure 27:
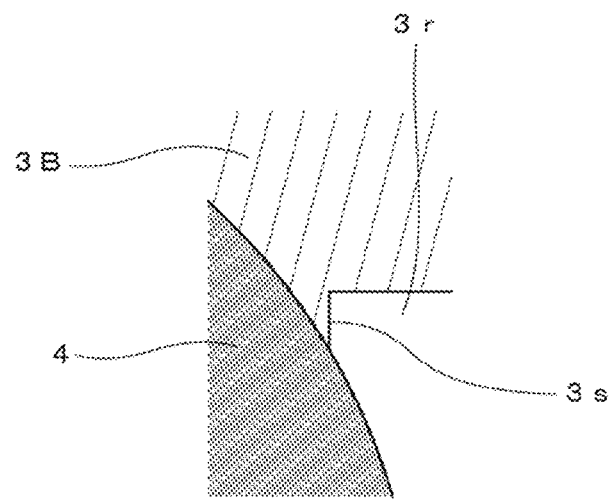
FIG. 27 is an enlarged cross-section view showing a situation of a screen contacting portion attached to a holder.

As shown in FIG. 27, between an inner circumferential surface of the opening 3r formed on the second holder 3B and the screen contacting portion 4, a flat face 3s, which is perpendicular to the axis of the holder Ax of the second holder 3B (See FIG. 28), is integrally formed with the second holder 3B.

A core-pin (not shown in the drawings) is inserted to the opening 3r on a backside of the screen contacting portion 4 when the ball-shaped screen contacting portion 4 is attached to the second holder 3b by insert molding.

In this case, a flat face along the flat face 3s is formed at an end portion of the core pin by forming the flat face 3s.

This allows solving the problem that an annular knife-edge portion along the backside of the screen contacting portion 4 should be formed on the core pin side, to eliminate danger due to the knife-edge formed on the core pin, and to ensure the durability of the core pin itself.

The exposed portion, the area, of the back side of the ball-shaped screen contacting portion 4 becomes smaller, by forming the flat face 3s. As shown in FIG. 26, however, the conductive portion 6a of the connecting member 6 can be into contact with the back side of the ball-shaped screen contacting portion 4 almost at the center, by setting a relation that the inner diameter a of the opening 3r is larger than the inner diameter b of the axis hole 3j. This relation allows to ensure a reliable connection between the connecting member 6 and the screen contacting portion 4.

FIG. 28 shows an enlarged view of the tip end of the stylus pen 1 in a supposed state where an inputting operation is performed with the stylus pen 1 extremely tilted to the touch screen surface.

The configuration is characterized in that the tip portion P1 of the second holder 3B is positioned closer to the axis line Ax of the second holder 3B than a tangent line (indicated by the same reference number as the screen surface 8) connecting the screen contacting portion 4 and the second holder 3B.

This configuration prevents the tip end P1 of the second holder 3B from contacting with the screen surface 8 even when the stylus pen 1 is tilted extremely. This effectively prevents the retaining force of the screen contacting portion 4 from being reduced due to the influence of wear of the tip end of the second holder 3B due to long-term use of the stylus pen 1.

In other words, by forming the tip end P1 of the holder to be thinned to a certain level, the visibility of the screen contacting portion 4 at the tip end of the holder can be increased. This structure can provide a stylus pen capable of reducing mistouching to the touch screen 8.

Figure 29:
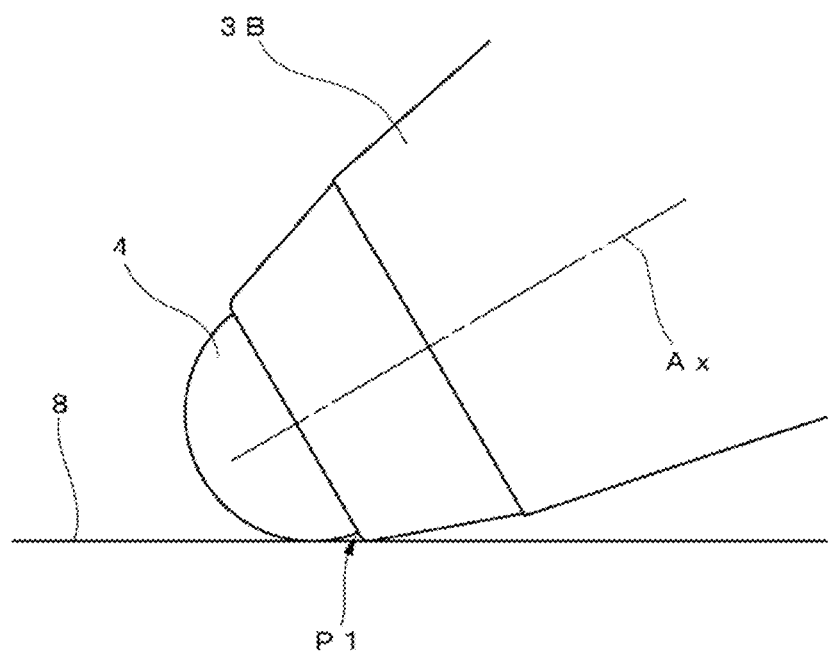
FIG. 29 is an enlarged view illustrating a modified example of the tip end of the holder.
Figure 30:
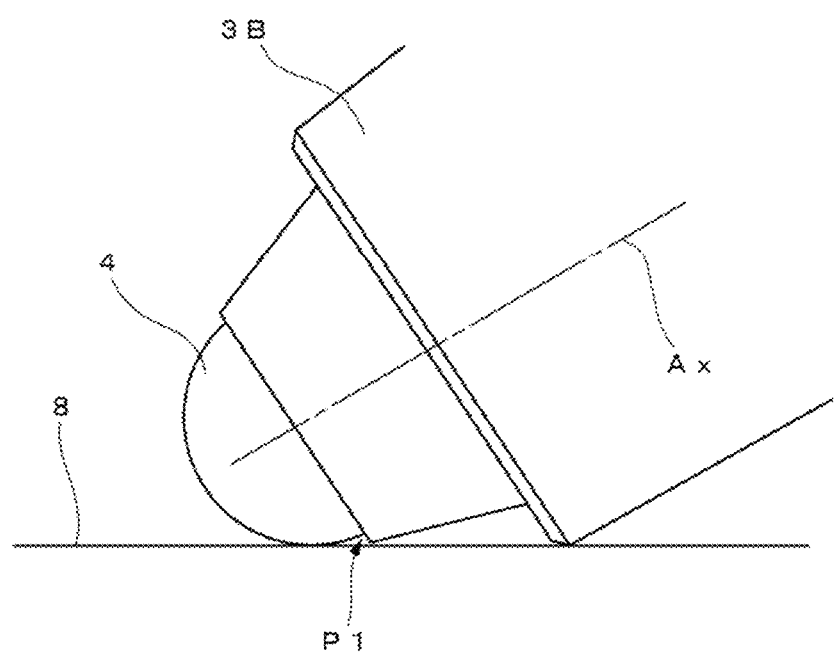
FIG. 30 is an enlarged view illustrating another modified example of the tip end of the holder.

FIG. 29 shows an enlarged view of a first modified example of the tip end of the holder, similar to the state shown in FIG. 28. FIG. 30 shows an enlarged view of a second modified example of the tip end of the holder, similar to the state shown in FIG. 28.

In the first and second modified examples of the stylus pen, external views of the second holder 3B are slightly different from those shown in FIG. 16 to FIG. 28, but the other configuration is similar to the third embodiment.

In the first and second modified examples, respectively shown in FIG. 29 and FIG. 30, the tip end P1 of the second holder 3B is positioned closer to the axis line Ax of the second holder 3B than a tangent line 8 connecting the screen contacting portion 4 and the second holder 3B.

Therefore, stylus pens shown in FIG. 29 and FIG. 30 can achieve an equivalent action and effect described based on FIG. 28.

Examples shown in FIG. 28 to FIG. 30 respectively illustrate relation between the tip end P1 of the second holder 3B and a tangent line 8 connecting the screen contacting portion 4 and the second holder 3B. The relation is desirably considered from the entire point of view of the holder 3 including the first holder 3A and the second holder 3B. That is, the tip end P1 of the holder 3 is positioned closer to the axis line Ax of the second holder 3B than a tangent line 8 connecting the screen contacting portion 4 and the holder 3.

According to the structure shown in FIG. 28 to FIG. 30, since the tip end of the holder 3 is positioned closer to the axis line Ax of the second holder 3B than a tangent line 8 connecting the screen contacting portion 4 and the holder 3, the tip end of the holder 3 is not into contact with the screen surface 8 even when an inputting operation is performed with extremely tilting the stylus pen 1 to the screen surface 8. This effectively prevents the retaining force for the screen contacting portion 4 from being reduced subjected to influence of long term use of the stylus pen 1, such as abrasion of the tip end of the second holder 3B.

In other words, the thickness of the portion of the tip end of the holder in contact with the screen contacting portion is formed to be relatively thin, because reduction over time of the retaining force of the screen contacting portion 4 can be prevented. This structure allows the screen contacting portion 4 of the tip end of the holder to be easily seen, and resultantly a stylus pen capable of reducing mistouching to the touch screen 8 can be provided.

Further, the second holder 3B retaining the ball-shaped screen contacting portion 4 at the tip and the first holder 3A just behind the second holder 3B are formed of self-lubricating resin such as polyacetal as described above. Therefore, as shown in FIG. 28 to FIG. 30, for example, when an input operation is performed with the barrel being extremely tilted, this construction can contribute to reducing the degree of damage to the screen surface, even if a part of the holder 3 comes into contact with the screen surface.

The fourth embodiment of the stylus pen according to the present invention is shown in FIG. 31 and FIG. 32.

In a stylus pen 11 shown as the fourth embodiment, a single component of a stylus pen (hereinafter also referred as a stylus refill 1), which is configured similarly to the stylus pen 1 shown as the second embodiment, is housed in a barrel 12 such that the screen contacting portion 4 of the stylus refill 1 can be extended or retracted from a tip end opening 14 of the barrel 12.

The stylus pen refill 1 housed in the barrel 2 is shown in FIG. 32, the respective corresponding portions to the stylus pen 1 described as the second embodiment are indicated by the same reference numerals. Thus, the detailed description is omitted.

In the stylus pen refill 1, however, the first holder 3A is attached to a shaft 7 and the fitting portion 6c of the connecting member 6 is fitted and attached between the shaft 7 and the first holder 3A.

As shown in FIG. 31, an anti-slipping part 12a whose surface is roughened is applied on the front side of the barrel 12, and the spring portion 6b and the fitting portion 6c of the connecting member 6 that is housed in the stylus pen refill 1 are disposed to locate inside of the anti-slipping part 12a that is applied on the outer side of the barrel 12.

That is, this embodiment is configured such that a capacitive touch function is given to the screen contacting portion 4 by capacitively coupling between the fingertip holding the anti-slipping part 12a and the spring portion 6b and the fitting portion 6c of the connecting member 6 having a relatively large surface area.

A proximal part 13a of a clip 13 is buried and attached at the rear end of the barrel 12, the front end of the barrel 12 is formed to be tapered off, and the screen contacting portion 4 is configured to be extended or retracted through the front-end opening 14.

At the proximal part of the clip 13, a knocking rod 15 movable along the axis direction is disposed to penetrate the proximal part, and a drive mechanism is disposed with which the screen contacting portion 4 of the stylus pen refill 1 is extended or retracted through the front-end opening 14 by every knocking operation of the knocking rod 15. As the drive mechanism 16, a rotary extension mechanism including a cam groove and a rotary cam member, known as the Kern knock mechanism, for example, can be used.

The reference numeral 17 in FIG. 13 is a return spring, disposed between the barrel 12 and the stylus pen refill 1, that energizes the screen contacting portion 4 of the stylus pen refill 1 in the direction as to house in the barrel 12.

In the fourth embodiment of the stylus pen shown in FIG. 31 and FIG. 32, the screen contacting portion 4 of the stylus pen refill 1 is constructed to be extended or retracted through the front-end opening 14 by knocking operation of the knocking rod 15. This can also be constructed to achieve, for example, a rotary extension type stylus pen in which the screen contacting portion 4 of the stylus pen refill 1 is extended or retracted through the front-end opening 14 by relatively rotating the rear barrel against the front barrel of the barrel 12.

According to the fourth embodiment in which the knock-type writing utensil includes a stylus pen refill 1, the larger the knocking operation load of the knocking rod 15 is, the larger the degree of impulse becomes when the stylus pen refill 1 is retracted by the return spring 17 into the barrel 12. It is necessary to increase a pressing load by the spring portion 6b of the connecting member 6 of the stylus pen refill 1 to the screen contacting portion 4 to a certain level.

A pressing load due to the coiled spring portion 6b of the stylus pen refill 1 shown in FIG. 32 to the screen contacting portion 4 is set to 0.26 N; in contrast, a load by knocking operation of the fourth embodiment shown in FIG. 31 is 4 N. That is, the ratio of the pressing load by the spring portion to the knocking operation load is set 6.5%.

The ratio of the pressing load by the spring portion to the knocking operation load is set to be less than 50% at maximum, desirably less than 30%, and the above ratio of 6.5% is considered to be a preferable value if a safety factor is taken into account.

Figure 33A:
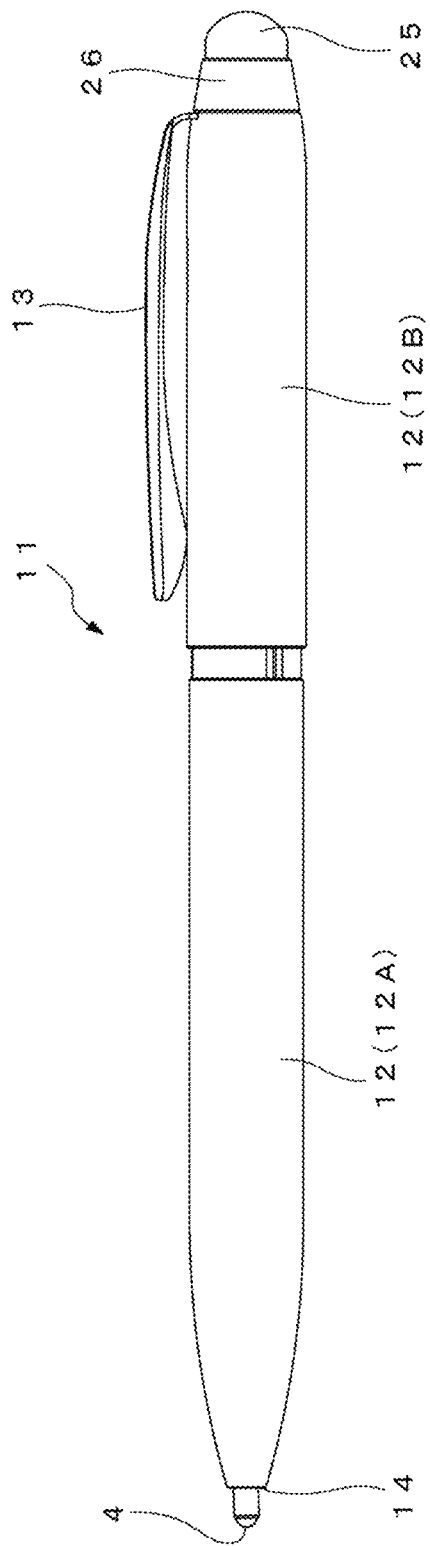
FIGS. 33A and 33B show an overall composition of a fifth embodiment in which a single stylus pen is housed in a barrel of a multiple-element writing instrument.
Figure 33B:
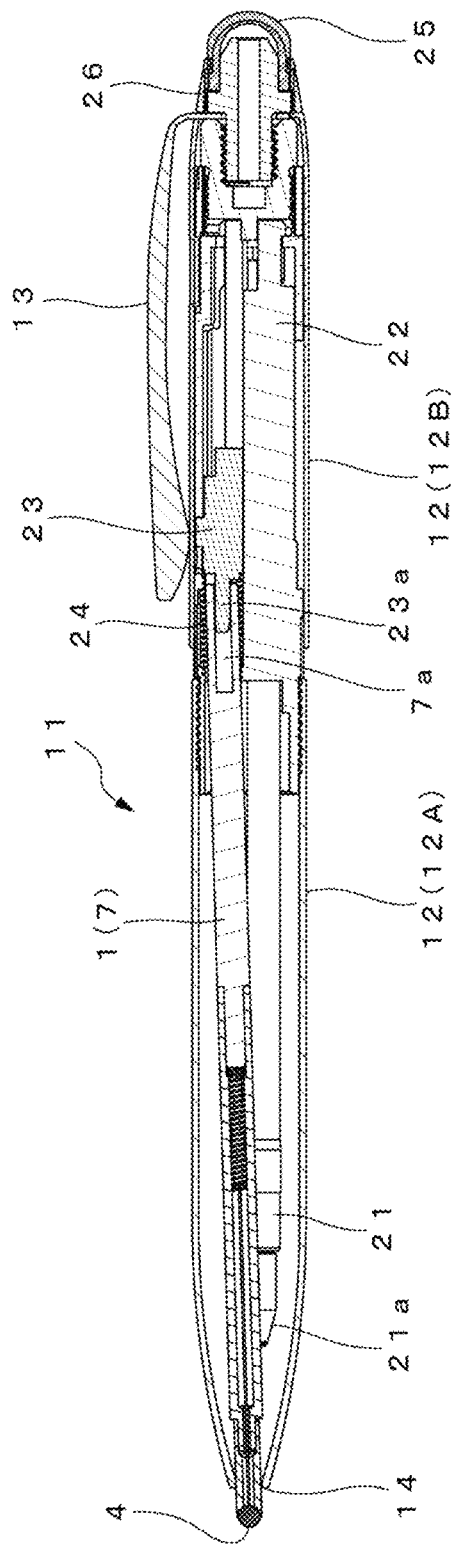
Figure 35:
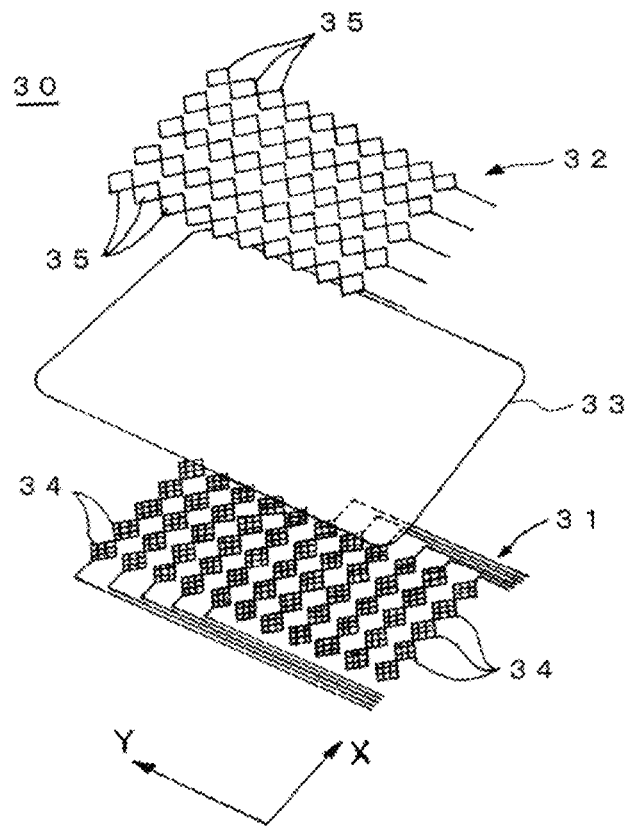
FIG. 35 is a disassembled perspective view schematically showing main parts of a conventional touch screen.
Figure 36:
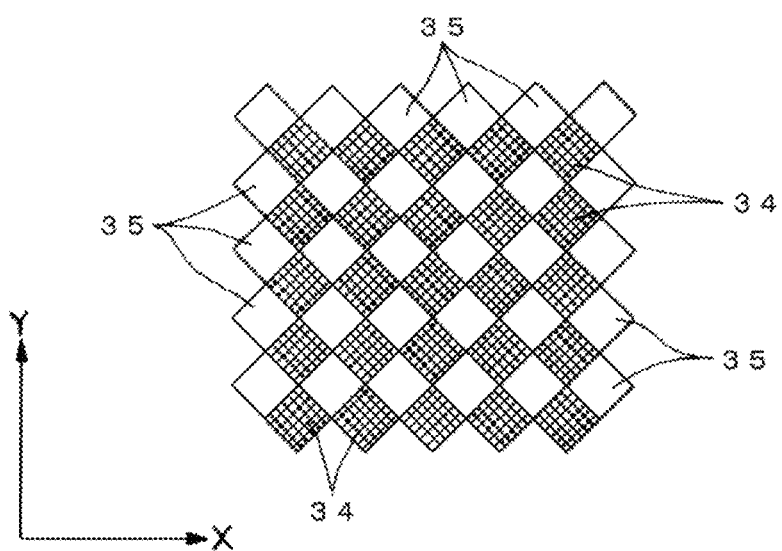
FIG. 36 is a plan view showing the main parts of the conventional touch screen shown in FIG. 35.

FIG. 33 and FIG. 34 show a fifth embodiment according to the present invention.

A stylus pen 11 shown as the fifth embodiment is constructed to be a multiple writing utensil also served as a stylus pen in which a single stylus pen 1, or a stylus pen refill, is housed in the barrel 12 and other writing refill is also housed in the barrel 12.

The stylus pen refill 1 to be housed in the barrel 12 is shown in FIG. 34 and members that correspond to those of the stylus pen 1 shown in the second embodiment have the same reference numerals and the detail is omitted.

In the stylus pen refill 1, the first holder 3A is attached to the shaft 7 and the fitting portion 6c of the connecting member 6 is fitted and attached to between the shaft 7 and the first holder 3A. A locking hole 7a is further formed at the rear end of the shaft 7.

A multiple writing utensil also served as a stylus pen shown as the fifth embodiment has a construction that the barrel 12 is composed of a front barrel 12A and a rear barrel 12B, as shown in FIG. 33. The front barrel 12A is made by resin molding, and the rear barrel 12B is preferably made of a metal material or resin material in which carbon black, for example, is dispersed, both different from those of the front barrel 12A, and is made conductive.

At the rear end of the rear barrel 12B, a clip 13 is attached and the front end of the front barrel 12A is formed to be tapered off and a front-end opening 14 is formed.

In this embodiment, the spring portion 6b and the fitting portion (seat winding part) 6c of the metal connecting member housed in the stylus pen refill 1 are disposed so as to be close to the fingertip with which the front barrel 12A is grasped. That is, also in this embodiment, the screen contacting portion 4 is configured to have a touch function by capacitive coupling, by establishing capacitive coupling between the fingertip with which the front barrel 12A is gripped and the spring portion 6b and the fitting portion 6c of the metal connecting member 6 that has a relatively large surface area.

In addition, a ballpoint pen refill is used as a writing utensil refill 21 housed in the barrel 12, and in this example, other ballpoint pen refills different in colors are also housed shown overlapped in FIG. 33.

A cylindrical guide 22 is disposed in the barrel 12, and a plurality, three for example, of slide parts 23 that are slidable along the axis direction of the guide 22 are disposed with equal separation along the circumference of the guide 22. A protrusion 23a formed at the front end of one of the slides is fitted and locked by being inserted to the locking hole 7a formed on the shaft 7 of the stylus pen refill 1. Similarly the rear end of each of the ink containing tubes of ballpoint pen refills having different ink colors is fitted and locked, by inserting the protrusions 23a of the slide 22. Though not shown in FIG. 33, an operating portion provided on each slide 23 is disposed to protrude from the rear barrel 12B through respective guide grooves formed along the axis direction of the rear barrel 12B.

As shown in FIG. 33, the screen contacting portion 4 of the stylus pen refill 1 protrudes from the front end opening 14 by moving the operating portion of the slide 23 locking the stylus pen refill 1 forward along the rear barrel 12B. This action enables use of the stylus pen refill 1. By moving the operating portion of the slide 23, which locks the ballpoint pen refill 21, forward along the rear barrel 12B, the stylus pen refill 1 retracts by the return spring, and the ballpoint pen tip 21a of the ballpoint pen refill 21 protrudes from the front end opening 14. This action enables use of a writing utensil using the ballpoint pen refill 21.

In the fifth embodiment, a second screen contacting portion 25, whose tip end is formed in a convex curved surface, is further disposed at the rear end of the rear barrel 12B. The second screen contacting portion 25 is made of, for example, a flocked material in which conductive fibers are planted, and an exposed part of the flocked material at the tip end is formed to be nearly a hemisphere, and attached to the rear end of the rear barrel 12B with a fixing ring.

The second screen contacting portion 25 is electrically conducted to the conductive rear barrel 12B through the fixing ring. A touch function through capacitive coupling can be provided with the second screen contacting portion 25, by user's gripping the rear barrel 12B.

As also shown in FIG. 33, according to the fifth embodiment, the radius of curvature of the second screen contacting portion 25 is set to be larger compared to the radius of curvature of the screen contacting portion 4 of the stylus pen refill 1. Therefore, the screen contacting portion 4 and the second screen contacting portion 25 can be properly used, according to the size of the touch screen to be used, a surface area, or according to whether a and accurate inputting operation is necessary.

LIST OF REFERENCE NUMERALS 1 stylus pen (stylus pen refill)
2 barrel
2A barrel body
2B holding portion
2a diameter-reduced portion
2b closed face
2c small protrusion
2e smaller diameter portion
2f larger diameter portion
2g male screw thread
2h step
2i rib
2j annular recess
2k female screw thread
2m conductive film (Al deposited transfer film)
2n linear rib
2p annular rib
2q second annular rib
2r recess
3 holder
3A first holder
3B second holder
3a cylindrical portion
3b conical portion
3c opening
3d barrel portion
3e supporting hole
3f axis hole
3h cylinder portion
3i rib
3j axis hole
3k rear end of the holder
3m protrusion
3p fitting hole
3q annular rib
3r opening
3s flat face
4 screen contacting portion
tail plug
5a decorative member/anti-rolling member
6 connecting member
6a conductive portion
6b spring portion
6c fitting portion (seat winding part)
6d tapered portion
7 shaft
7a locking hole
8 screen surface
11 stylus pen
12 barrel
12A front barrel
12B rear barrel
12a anti-slipping part
13 clip
14 front-end opening
15 knocking rod
16 drive mechanism
17 return spring
21 writing utensil refill/ballpoint pen refill
21a writing tip/ballpoint pen tip
22 guide
23 slide part
23a protrusion
24 return spring
25 second screen contacting portion
26 fixing ring
Ax axis of the holder
P1 distal end of the holder

The invention claimed is:

1. A stylus pen for inputting information by bringing a screen contact portion into contact with a capacitive touch screen, comprising:
 a barrel;
 a holder made of non-conducting material attached to a front end of the barrel;
 the screen contacting portion made of a conductive material and being attached to a front end of the holder; and
 a connecting member made of a conductive material and disposed in the holder, the connecting member having a resilient action in the axial direction and a front end of the connecting member being brought into contact to the screen contacting portion to conduct electricity, wherein
 an outer diameter of the connecting member perpendicular to the axial direction is set to be smaller as compared with an outer diameter of the screen contacting portion perpendicular to the axial direction, and
 the screen contacting portion is a spherical body containing carbon material and an outer diameter thereof is formed in a range of 1 mm to 3 mm.

2. The stylus pen according to claim 1, wherein the barrel is formed of conductive material and a rear end of the connecting member is connected to the barrel.

3. The stylus pen according to claim 1, wherein a holding portion made of conductive material is provided at the front end of the barrel and the rear end of the connecting member is connected to the holding portion.

4. The stylus pen according to claim 1, wherein a conductive layer is formed on the barrel and the conductive layer is capacitively-coupled with the connecting member.

5. The stylus pen according to claim 1, wherein the connecting member comprises a conductive portion formed of a rectilinear rod contacting with the screen contacting portion, a coil-wound spring portion connected to the conductive portion, and a fitting portion connected to the spring portion, wherein an outer diameter of the conductive portion perpendicular to the axial direction is set to be smaller as compared with an outer diameter of the screen contacting portion perpendicular to the axial direction.

6. The stylus pen according to claim 5, wherein the fitting portion has an outer diameter set to be larger than the outer diameter of a coil-wound portion at the spring portion, and is fitted in an annular recess formed by utilizing a rear end of the holder.

7. The stylus pen according to claim 1, wherein a front end portion of the holder is positioned closer to the axis of the holder than a tangent line connecting the screen contacting portion and the holder.

8. The stylus pen according to claim 1, wherein a second screen contacting portion whose tip end is formed in a convex curved surface made of conductive material is disposed at a rear end of the barrel.

* * * * *